(12) United States Patent
Takagaki et al.

(10) Patent No.: US 11,242,496 B2
(45) Date of Patent: Feb. 8, 2022

(54) RELEASE AGENT FOR HOT-FORGING DIE, APPLICATION METHOD FOR SAME, AND APPLICATION DEVICE

(71) Applicant: Mazda Motor Corporation, Hiroshima (JP)

(72) Inventors: Masahito Takagaki, Hiroshima (JP); Yuzou Yamaga, Hiroshima (JP); Takeshi Maeda, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 645 days.

(21) Appl. No.: 16/088,786

(22) PCT Filed: Sep. 13, 2016

(86) PCT No.: PCT/JP2016/076938
§ 371 (c)(1),
(2) Date: Sep. 26, 2018

(87) PCT Pub. No.: WO2018/051400
PCT Pub. Date: Mar. 22, 2018

(65) Prior Publication Data
US 2020/0325412 A1  Oct. 15, 2020

(51) Int. Cl.
| | |
|---|---|
| *C10M 107/36* | (2006.01) |
| *B05C 11/10* | (2006.01) |
| *B05D 1/00* | (2006.01) |
| *B05D 7/14* | (2006.01) |
| *B21J 13/02* | (2006.01) |
| *C10M 173/02* | (2006.01) |
| *B21J 3/00* | (2006.01) |

(Continued)

(52) U.S. Cl.
CPC ............ *C10M 107/36* (2013.01); *B05C 11/10* (2013.01); *B05D 1/007* (2013.01); *B05D 1/02* (2013.01); *B05D 7/14* (2013.01); *B21J 3/00* (2013.01); *B21J 13/02* (2013.01); *C10M 173/02* (2013.01); *C10M 2209/123* (2013.01); *C10N 2020/06* (2013.01); *C10N 2040/24* (2013.01); *C10N 2040/242* (2020.05); *C10N 2040/36* (2013.01); *C10N 2050/12* (2020.05); *F16N 15/02* (2013.01); *F16N 15/04* (2013.01)

(58) Field of Classification Search
CPC .......... B05C 11/10; B05D 1/007; B05D 1/02; B05D 3/00; B05D 7/14; B21J 3/00; B21J 13/02; C10M 107/36; C10M 173/02; C10M 2201/041; C10M 2209/123; C10M 2217/044; C10N 2020/06; C10N 2030/56; C10N 2040/24; C10N 2040/242; C10N 2040/243; C10N 2040/36; C10N 2050/12; F16N 15/02; F16N 15/04
See application file for complete search history.

(56) References Cited

U.S. PATENT DOCUMENTS

| | | | | |
|---|---|---|---|---|
| 5,290,603 A | * | 3/1994 | Nielsen | .................. B05D 1/025 427/422 |
| 2015/0057401 A1 | * | 2/2015 | Suzuki | ...................... B22C 3/00 524/404 |

FOREIGN PATENT DOCUMENTS

| | | | |
|---|---|---|---|
| JP | 63286238 A | * | 11/1988 |
| JP | 63286238 A | | 11/1988 |

(Continued)

*Primary Examiner* — James C Goloboy
(74) *Attorney, Agent, or Firm* — Alleman Hall Creasman & Tuttle LLP

(57) ABSTRACT

A release agent for a hot-forging die, containing micronanobubbles.

6 Claims, 19 Drawing Sheets

(51) Int. Cl.
*B05D 1/02* (2006.01)
*C10N 50/00* (2006.01)
*C10N 40/24* (2006.01)
*F16N 15/02* (2006.01)
*F16N 15/04* (2006.01)
*C10N 40/20* (2006.01)
*C10N 20/06* (2006.01)
*C10N 40/36* (2006.01)

(56) References Cited

FOREIGN PATENT DOCUMENTS

| | | | | |
|---|---|---|---|---|
| JP | 2007268614 A | 10/2007 | | |
| JP | 2008082547 A | 4/2008 | | |
| WO | 2014188589 A1 | 11/2014 | | |
| WO | WO-2014188589 A1 * | 11/2014 | ............. | B29C 33/60 |

* cited by examiner

RELEASE AGENT FOR HOT-FORGING DIE, APPLICATION METHOD FOR SAME, AND APPLICATION DEVICE

TECHNICAL FIELD

The present disclosure relates to a release agent for a hot-forging die and an application method and application device for the same.

BACKGROUND ART

Conventionally, in a hot-forging method, in which a high-temperature material is forged with a press die, the die not only incurs a high face pressure, but also has problems of thermal fatigue due to contact with the high-temperature material and die wear due to sliding of the high-temperature material on the surface of the die. In general, therefore, a release agent is applied to the surface of the die after demolding for the purposes of improving the lubricity and releasability of the die and also accelerating cooling of the die surface.

For example, Patent Document 1 discloses a technology in which, with upper and lower dies for forge forming being kept opened after forming, a release agent injection nozzle is placed between the upper and lower dies and made to inject a release agent from its orifices toward corresponding sites of the upper and lower dies.

Patent Document 1 describes that the injection conditions such as the injection time/pressure of the release agent and the position of the release agent injection nozzle are adjusted depending on the temperatures detected by temperature sensors provided at sites of the upper and lower dies, thereby cooling the dies properly and improving the releasability.

CITATION LIST

Patent Document

PATENT DOCUMENT 1: Japanese Unexamined Patent Publication No. 2007-268614

SUMMARY OF THE INVENTION

Technical Problem

A conventional release agent made by mixing graphite, etc. in water has the following problems. A portion of a droplet of the release agent applied to the surface of a die that comes in contact with the die evaporates rapidly due to the heat of the die surface. This causes a so-called Leidenfrost phenomenon where an updraft of steam occurs due to rapid evaporation, reducing the contact area of the droplet with the die surface. Thus, sufficient cooling capability is no more obtained by the release agent, thereby requiring mass application of the release agent. Also, with mass application of the release agent, it becomes difficult to obtain a uniform graphite membrane that is responsible for the releasability.

In view of the above problems, an objective of the present disclosure is providing a release agent for a hot-forging die, and an application method for the same, in which, while the application amount of the release agent being kept within bounds, sufficient cooling capability can be obtained, and a uniform application membrane of the release agent can be formed.

Solution to the Problem

To attain the above objective, in the disclosed technology, micronanobubbles are contained in a release agent for a hot-forging die.

That is, the release agent for a hot-forging die according to the first technology disclosed herein contains micronanobubbles.

According to the above technology, with improved wettability of the release agent, the contact area between a droplet of the release agent and the die surface increases, accelerating vaporization of a solvent component of the release agent from the contact face. The vaporization of the solvent component of the release agent is also accelerated from micronanobubbles present in the droplet of the release agent as cores. It is therefore possible to cool the die in a short time and thus keep the application amount of the release agent within bounds. Thus, a release agent layer formed of the applied release agent can be made to have a sufficient thickness suitable for lubricity and releasability and also a uniform thickness.

In the second technology, the diameters of the micronanobubbles in the first technology are greater than or equal to 1 μm and less than or equal to 200 μm.

According to the above technology, it is possible to effectively improve the cooling performance of the release agent, thereby keeping the application amount of the release agent within bounds and also forming a uniform release agent layer having a sufficient thickness in a short time.

In the third technology, the content of the micronanobubbles in the second technology is greater than or equal to 0.1 vol % and less than or equal to 10 vol %.

According to the above technology, the cooling performance of the release agent can be further improved.

The application method for a release agent for a hot-forging die according to the fourth technology disclosed herein includes spraying the release agent for a hot-forging die according to any of the first to third technologies onto a hot-forging die.

According to the above technology, by cooling the hot-forging die after forming in a shorter time and forming a uniform release agent layer having a sufficient thickness on the surface of the hot-forging die, the lubricity and releasability of the hot-forging die can be enhanced.

In the fifth technology, the release agent for a hot-forging die in the fourth technology is sprayed onto the hot-forging die in a shape of particles having a Sauter mean diameter of greater than or equal to 10 μm and less than or equal to 30 μm.

According to the above technology, more uniform application of the release agent to the hot-forging die is possible.

In the sixth technology, the average thickness of a release agent layer formed of the release agent for a hot-forging die applied to the hot-forging die in the fifth technology is greater than or equal to 2.3 μm and less than or equal to 15 μm.

According to the above technology, good lubricity and releasability of the hot-forging die can be secured.

In the seventh technology, the method in the sixth technology includes the steps of: filling a storage unit provided with a bubble generator/bubble generators and an agitator/agitators with a release agent undiluted solution; generating micronanobubbles in the release agent undiluted solution by the bubble generator(s); agitating the release agent undiluted solution by the agitator(s) thereby dispersing the micronanobubbles generated in the release agent undiluted solution uniformly to obtain the release agent for a hot-forging die; supplying the release agent for a hot-forging die to a spraying unit/spraying units; and spraying the release agent for a hot-forging die onto the hot-forging die by the spraying unit(s), wherein, in the generating step, air is supplied to the bubble generator(s) with an air supply pressure of greater than or equal to 0.03 MPa and less than or equal to 0.3 MPa, and the supply amount of the micronanobubbles by the bubble generator(s) is greater than or equal to 1 L/min and less than or equal to 100 L/min, and in the supplying step, the supply pressure to the release agent for a hot-forging die is greater than or equal to 0.5 MPa and less than or equal to 2.0 MPa, and the atomizing air pressure supplied to the spraying unit(s) is greater than or equal to 0.20 MPa and less than or equal to 0.80 MPa.

According to the above technology, it is possible to prepare a release agent containing a sufficient amount of micronanobubbles. Also, it is possible to apply such a release agent uniformly to the hot-forging die. Thus, the cooling performance of the release agent for the die surface can be enhanced, permitting formation of a uniform release agent layer having a sufficient thickness.

The application device for a release agent for a hot-forging die according to the eighth technology disclosed herein is an application device for a release agent for a hot-forging die for applying the release agent for a hot-forging die according to any of the first to third technologies to a surface of a hot-forging die, including: a storage unit for storing the release agent for a hot-forging die; an agitator/agitators provided in the storage unit for agitating the release agent for a hot-forging die stored in the storage unit; a bubble generator/bubble generators for supplying the micronanobubbles into the release agent for a hot-forging die stored in the storage unit; and a spraying unit/spraying units for spraying the release agent for a hot-forging die stored in the storage unit onto the hot-forging die.

According to the above technology, it is possible to apply the release agent having a sufficient amount of micronanobubbles uniformly to the hot-forging die. Thus, the cooling performance of the release agent for the die surface can be enhanced, permitting formation of a uniform release agent layer having a sufficient thickness.

Advantages of the Invention

According to the above technology, with improved wettability of the release agent, the contact area between a droplet of the release agent and the die surface increases, accelerating vaporization of a solvent component of the release agent from the contact face. The vaporization of the solvent component of the release agent is also accelerated from micronanobubbles present in the droplet of the release agent as cores. It is therefore possible to cool the die in a short time and thus keep the application amount of the release agent within bounds. Thus, a film thickness of a release agent layer formed of the applied release agent can be made to have a sufficient thickness suitable for lubricity and releasability and also a uniform thickness.

DESCRIPTION OF EMBODIMENTS

An embodiment of the present disclosure will be described hereinafter in detail with reference to the accompanying drawings. Note that the preferred embodiment to be described hereinafter is essentially a mere illustration, and by no means meant to restrict the present disclosure, applications thereof, or uses thereof.

<Crankshaft>

Figure 1:
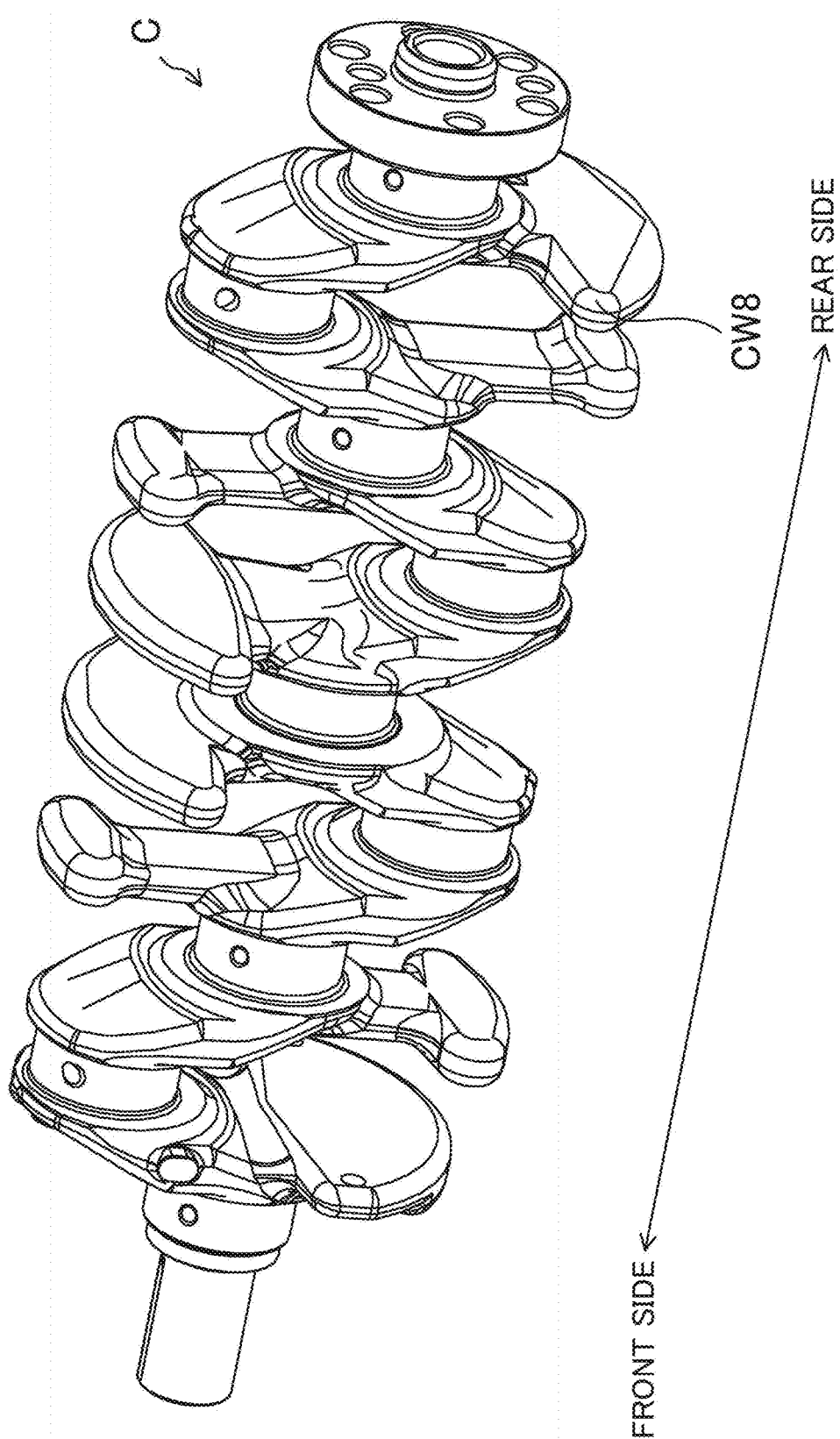
FIG. 1 is a perspective view of a crankshaft used for an in-line four-cylinder engine.
Figure 2:
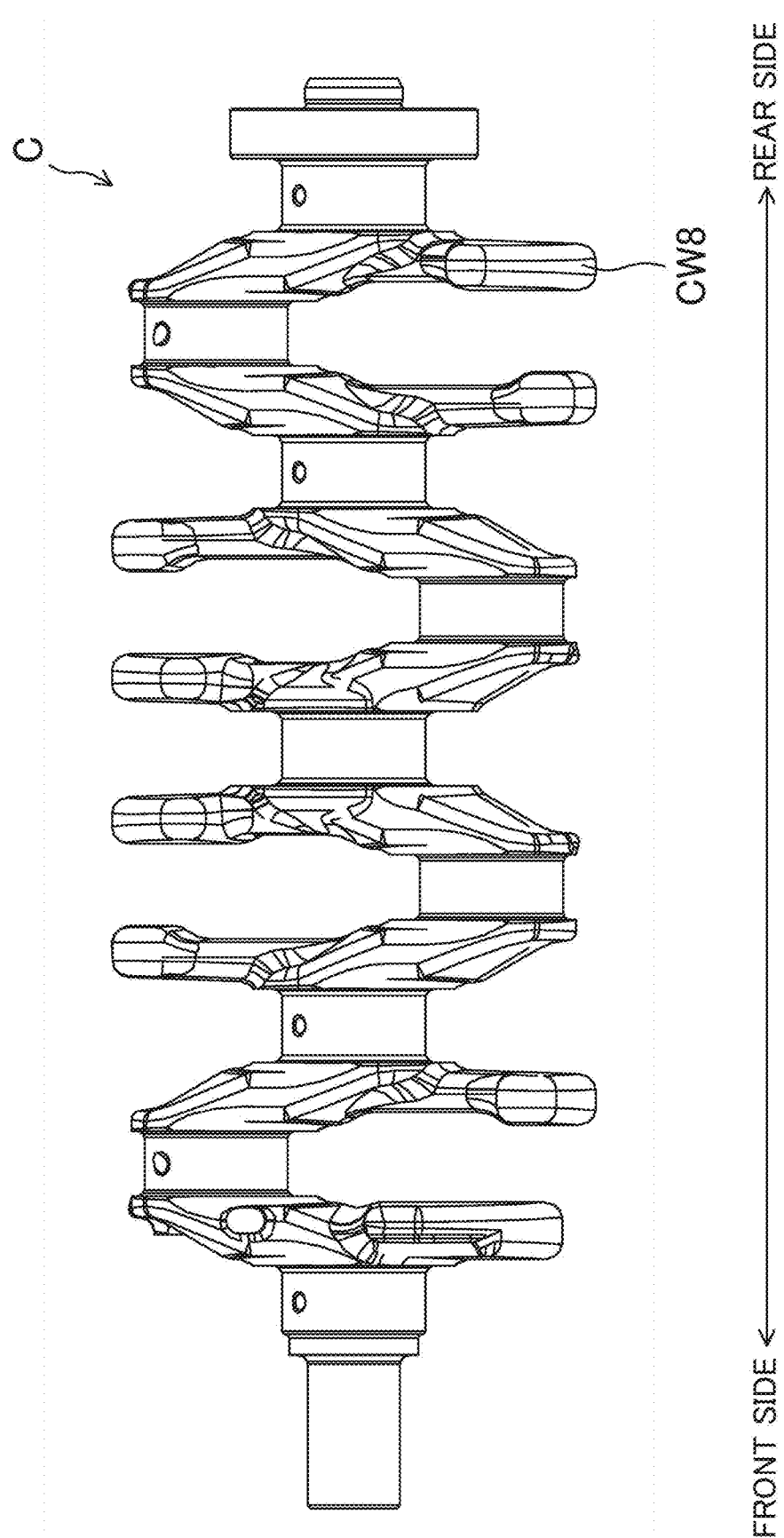
FIG. 2 is a side view of the crankshaft of FIG. 1.

FIGS. 1 and 2 show a crankshaft C as a component of an automotive engine.

The crankshaft C is a component of an in-line four-cylinder gasoline engine mounted on a vehicle such as a four-wheel car, for example. In the configuration of an engine in which the crankshaft C is placed, although illustration and detailed description thereof is omitted, the crankshaft C is rotatably supported by a crank case provided in a cylinder block, and coupled to a piston in a cylinder bore via a connecting rod. Thus, the crankshaft C converts reciprocating movement of the piston to rotational movement, functioning as an output rotational axis of the engine. In FIGS. 1 and 2, the front side and the rear side are shown by the arrow.

A manufacturing process for the crankshaft C will be roughly described as follows although illustration and detailed description thereof is omitted. That is, first, in heating step SI, a round-bar steel material K, for example, as the material is heated to approximately 1200° C. with a bar heater, for example. In roll forming step SII, the heated steel material K is cut with a roll former and crushed. Thereafter, the steel material K is transported to a press forming apparatus P, and press-formed in press forming step SIR to obtain the crankshaft C shown in FIGS. 1 and 2. The crankshaft C is then subjected to high-frequency sintering, carburizing, and nitriding (tufftriding) in its axis portion, before being supplied as an engine component.

The release agent for a hot-forging die, the application method and application device for the same are applied to a die 1 (hot-forging die) provided in the press forming apparatus P described above.

Note that the release agent, the application method and application device for the same according to this embodiment can be used for dies for, not only the crankshaft described above, but also hot-forged products such as a connecting rod and a cam shaft. Also, the release agent, etc. according to this embodiment can be applied to dies for, not only the automotive engine components described above, but also transmission components and suspension components of automobiles, engine components of aircraft, ships, etc. and other various types of formed products manufactured using a hot-forging method.

<Die>

FIGS. 3 to 7 show a configuration of the die 1 (hot-forging die) for manufacturing the crankshaft C.

Figure 3:
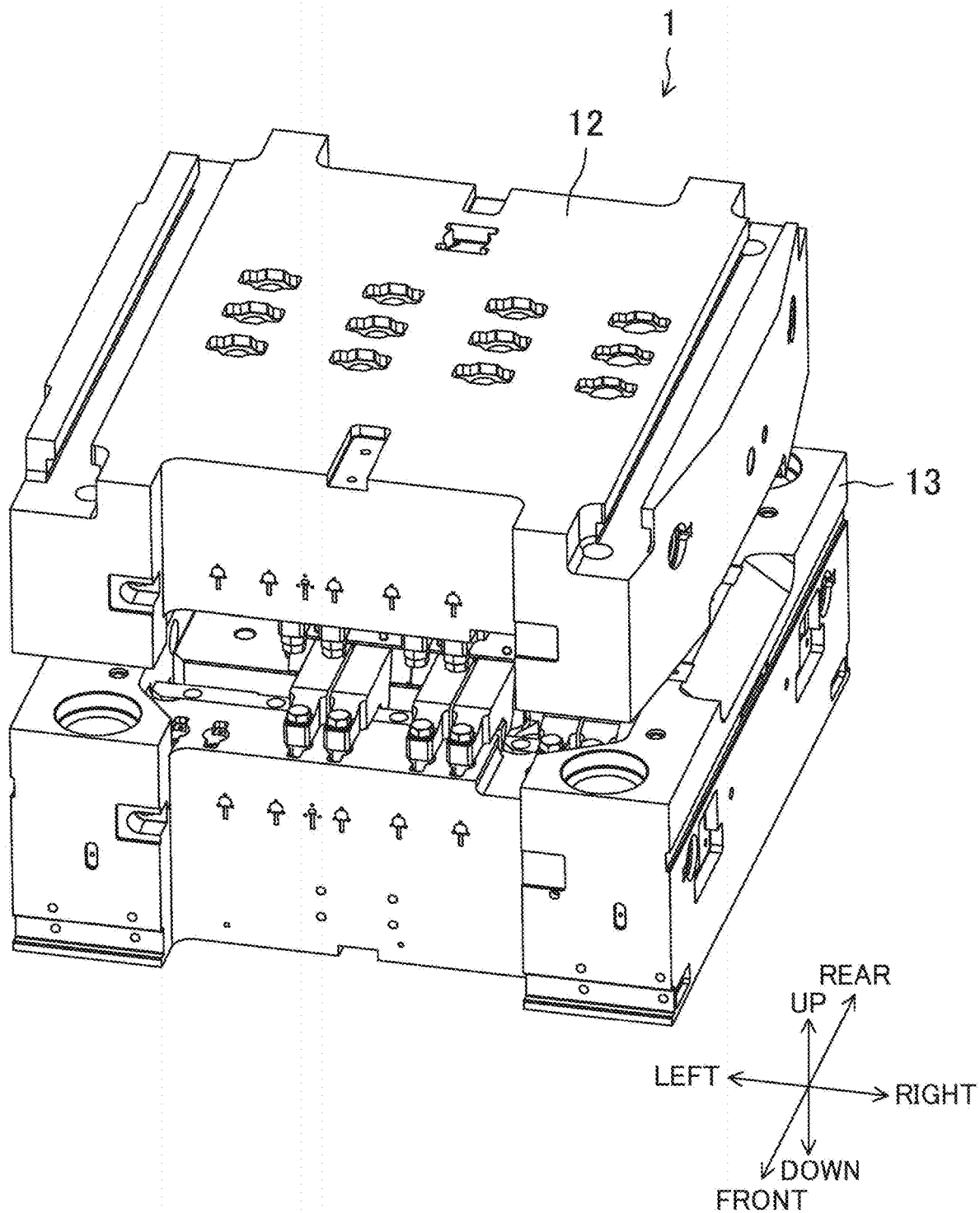
FIG. 3 is a perspective view of a die for manufacturing the crankshaft of FIG. 1 by hot-forging.

As shown in FIG. 3, the die 1 is constituted by an upper die 12 and a lower die 13.

Figure 4:
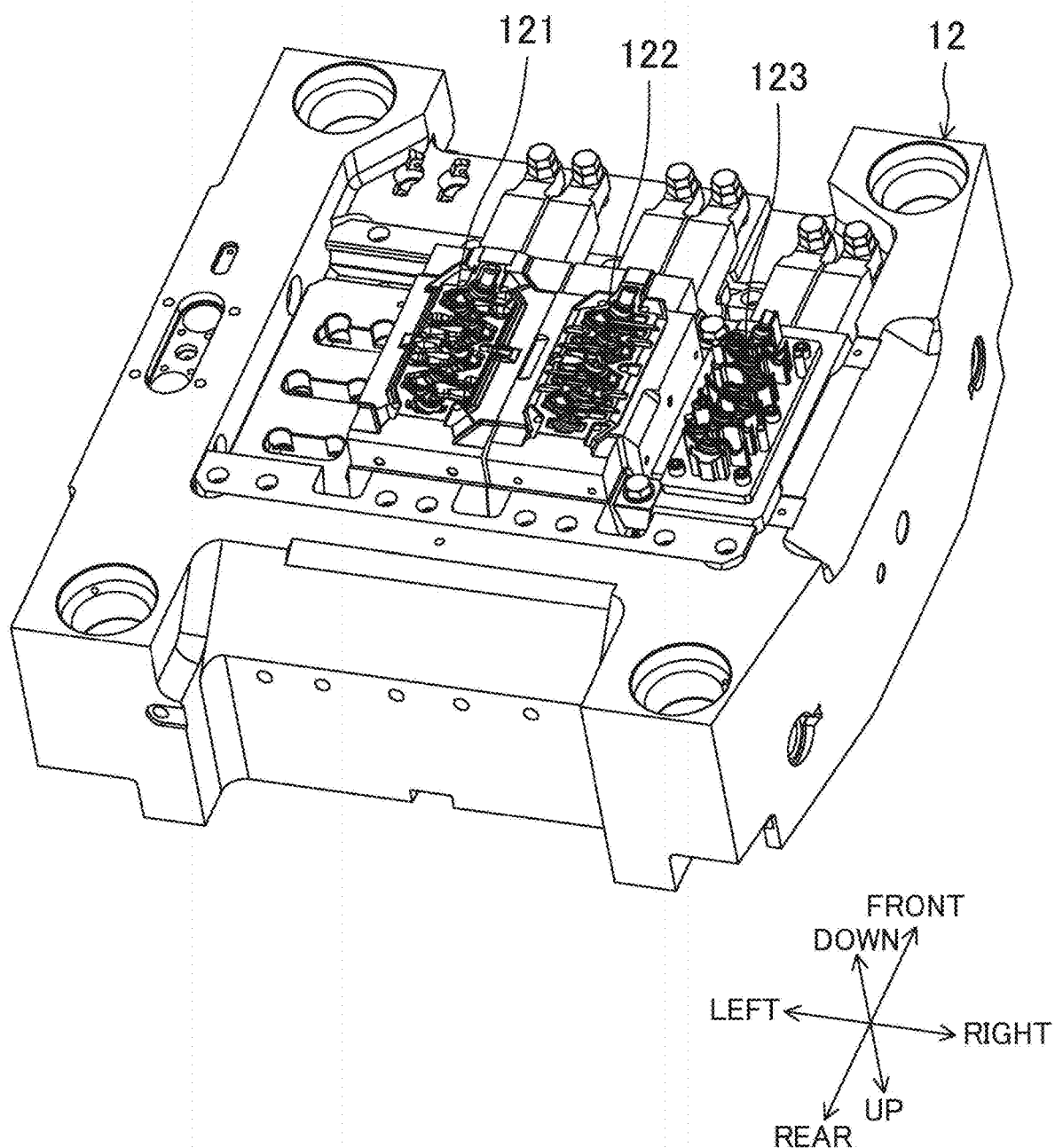
FIG. 4 is a perspective view of an upper die of the die of FIG. 3.
Figure 5:
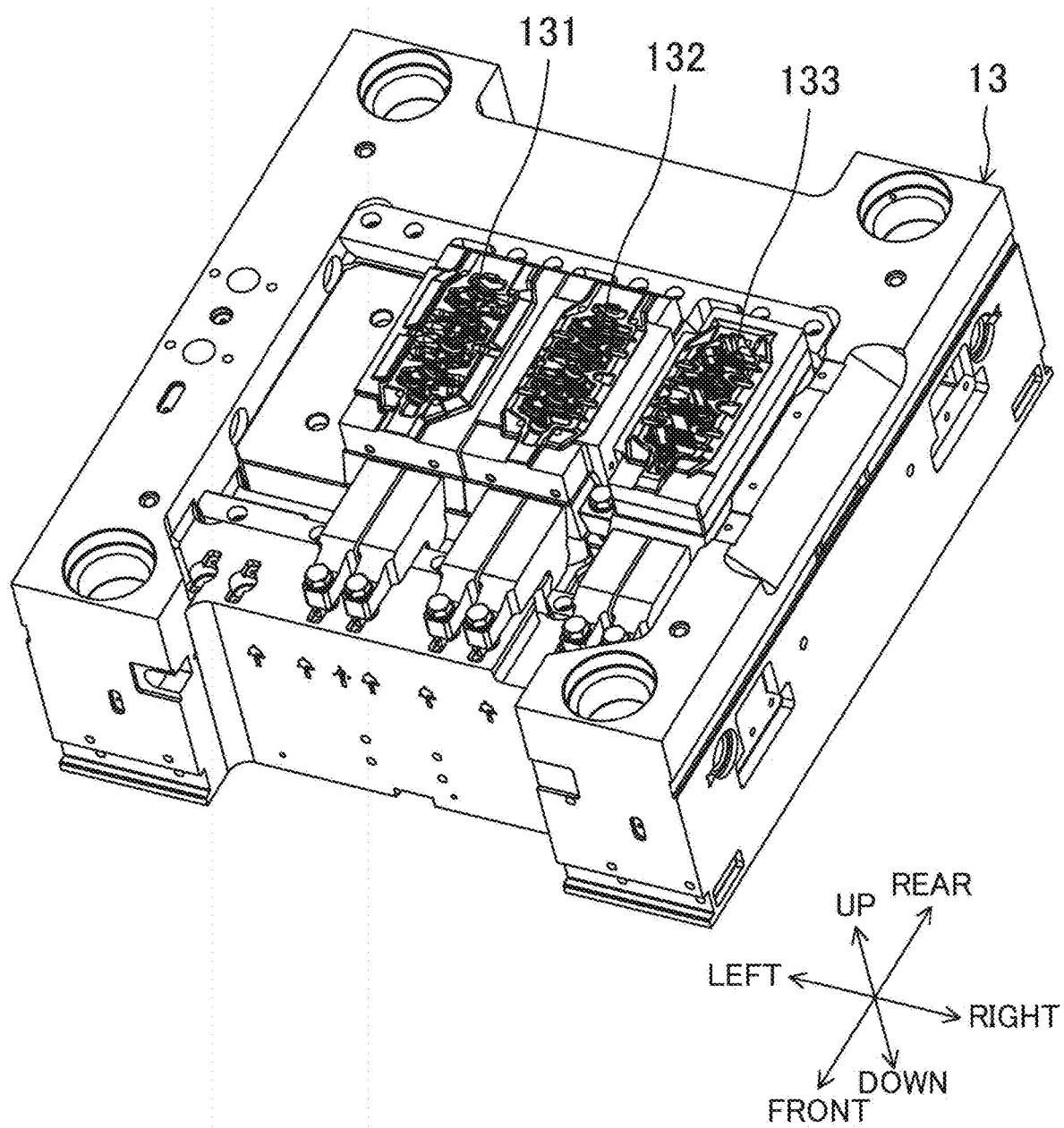
FIG. 5 is a perspective view of a lower die of the die of FIG. 3.
Figure 6:
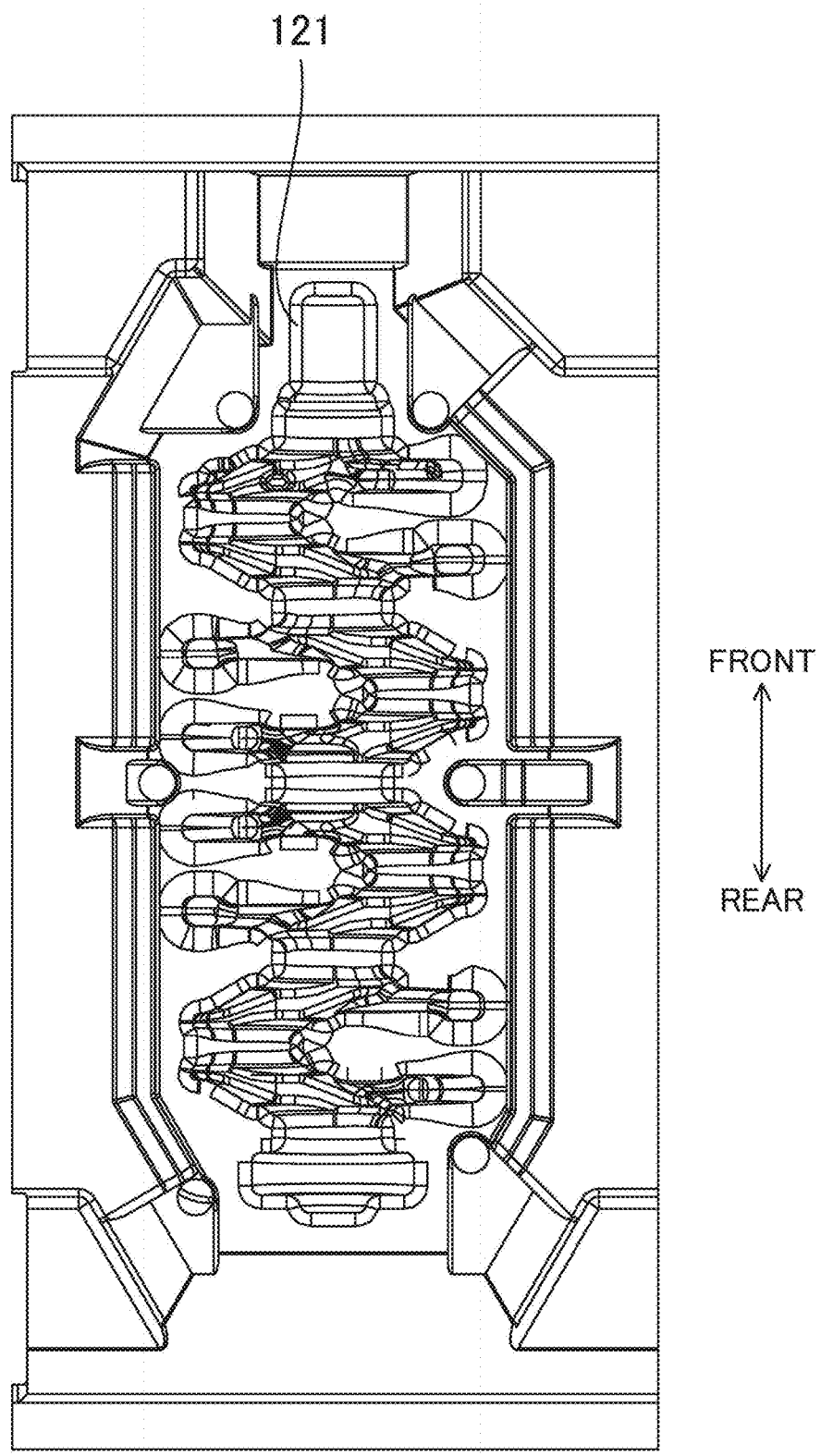
FIG. 6 is a plan view of a rough upper die in the upper die of FIG. 4.
Figure 7:
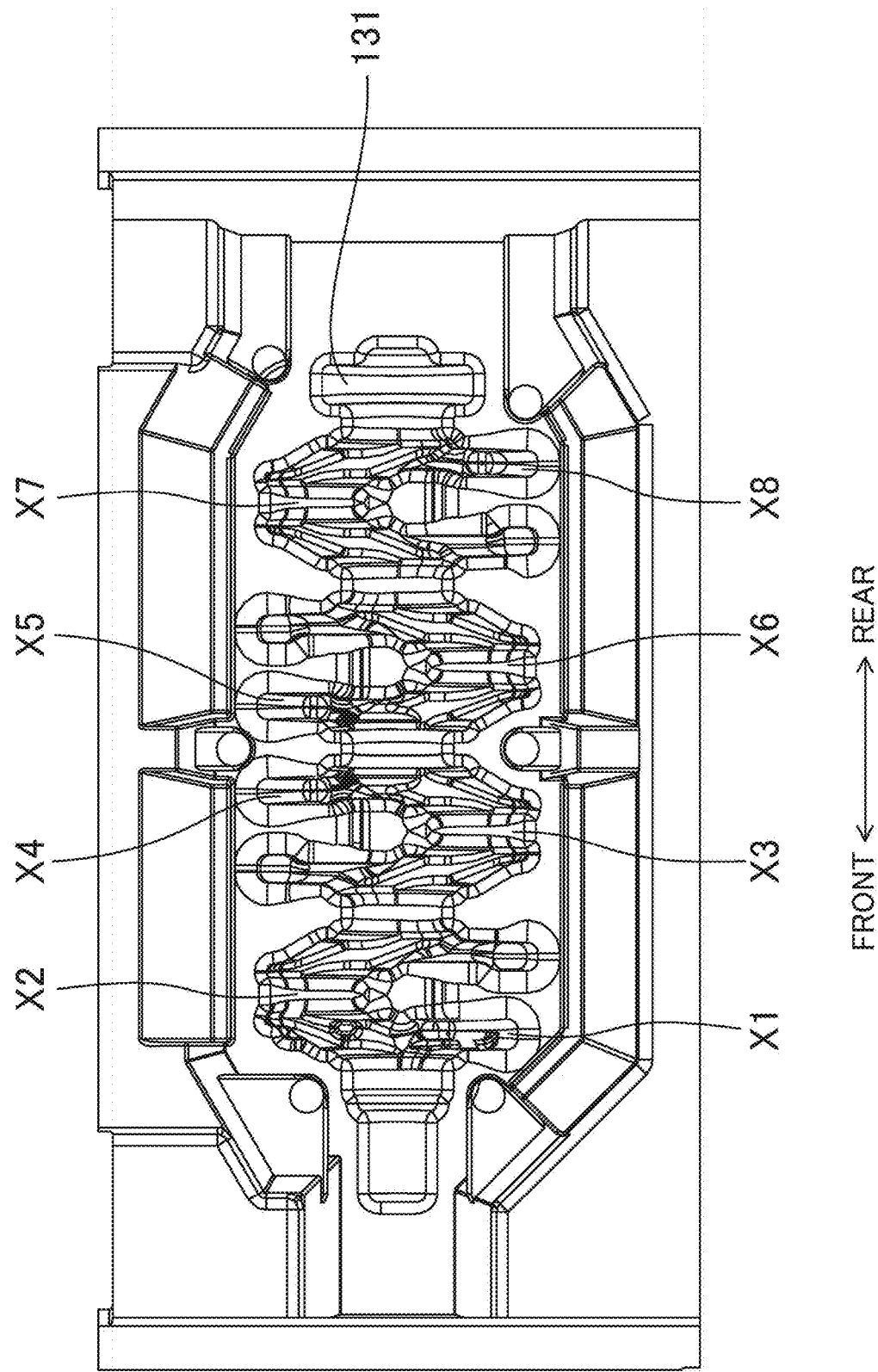
FIG. 7 is a plan view of a rough lower die in the lower die of FIG. 5.

The upper die 12 has a rough upper die 121, a finishing upper die 122, and a trimming upper die 123 as shown in FIG. 4. The lower die 13 has a rough lower die 121, a finishing lower die 132, and a trimming lower die 133 as shown in FIG. 5. The rough upper die 121 and the rough lower die 131 constitute a rough die X, the finishing upper die 122 and the finishing lower die 132 constitute a finishing die Y, and the trimming upper die 123 and the trimming lower die 133 constitute a trimming die Z. FIGS. 6 and 7 respectively show enlarged views of the rough upper die 121 and the rough lower die 131 of the rough die X.

The steel material K after the roll forming step SII described above is first pressed with the rough die X for rough forming in the press forming step SIII. The steel material K is then moved to the finishing die Y for finishing forming, and subsequently to the trimming die Z for trimming forming.

In the rough forming with the rough die X, which is the first press forming for the steel material K, the filled state of fine portions of the rough upper die 121 and the rough lower die 131 shown in FIGS. 6 and 7 with the steel material K greatly affects the yield of the crankshaft C after the trimming forming. For example, a counterweight CW8 of the crankshaft C shown in FIGS. 1 and 2 is provided for correcting unbalance of the crankshaft to prevent vibration. It is therefore important to sufficiently fill the corresponding portion with the steel material K in the rough forming.

Note herein that the up-down direction, the left-right direction, and the front-rear direction are based on the die 1 as shown in FIGS. 3 to 8. That is, the "up-down direction" refers to the direction of arrangement of the upper die 12 and the lower die 13 of the die 1 as shown in FIG. 3. The "left-right direction" refers to the direction of arrangement of the rough upper die 121 and the rough lower die 131, the finishing upper die 122 and the finishing lower die 132, and the trimming upper die 123 and the trimming lower die 133 as shown in FIGS. 3 to 5. The "front-rear direction" refers to the direction of the front and rear of the die 1 as viewed from FIGS. 3 and 5. As for the "front-rear direction" in the rough upper die 121 and the rough lower die 131 shown in FIGS. 6 and 7, the front refers to the side for forming the front side of the crankshaft C shown in FIGS. 1 and 2 and the rear refers to the side for forming the rear side thereof.

In the press forming apparatus P having the die 1, also, a radiation thermometer not shown is provided for measuring the surface temperatures of the rough upper die 121, the rough lower die 131, the finishing upper die 122, the finishing lower die 132, the trimming upper die 123, and the trimming lower die 133. With this radiation thermometer, the die surface temperature after forming and before application of a release agent and the die surface temperature after application of a release agent and before next forming can be measured as needed. Note that the press forming apparatus P is a crank press, configured so that an upper ram to which the upper die 12 is attached moves vertically with rotation of a crank axis. It is also configured so that, by monitoring the rotation angle of the crank axis, the vertical position of the upper die 12 is detected, and the die surface temperature is automatically measured/recorded with the above-described radiation thermometer when the crank axis is at a preset rotation angle.

<Application Device and Application Method for Release Agent>

Hereinafter, an application device 2 (application device for a release agent for a hot-forging die) for a release agent 21 (release agent for a hot-forging die) according to this embodiment and an application method (application method for a release agent for a hot-forging die) for the release agent 21 using the application device 2 will be roughly described, and thereafter the configuration of each component of the application device 2, as well as the release agent 21 according to this embodiment, will be described in detail.

[Application Device for Release Agent]

Figure 8:
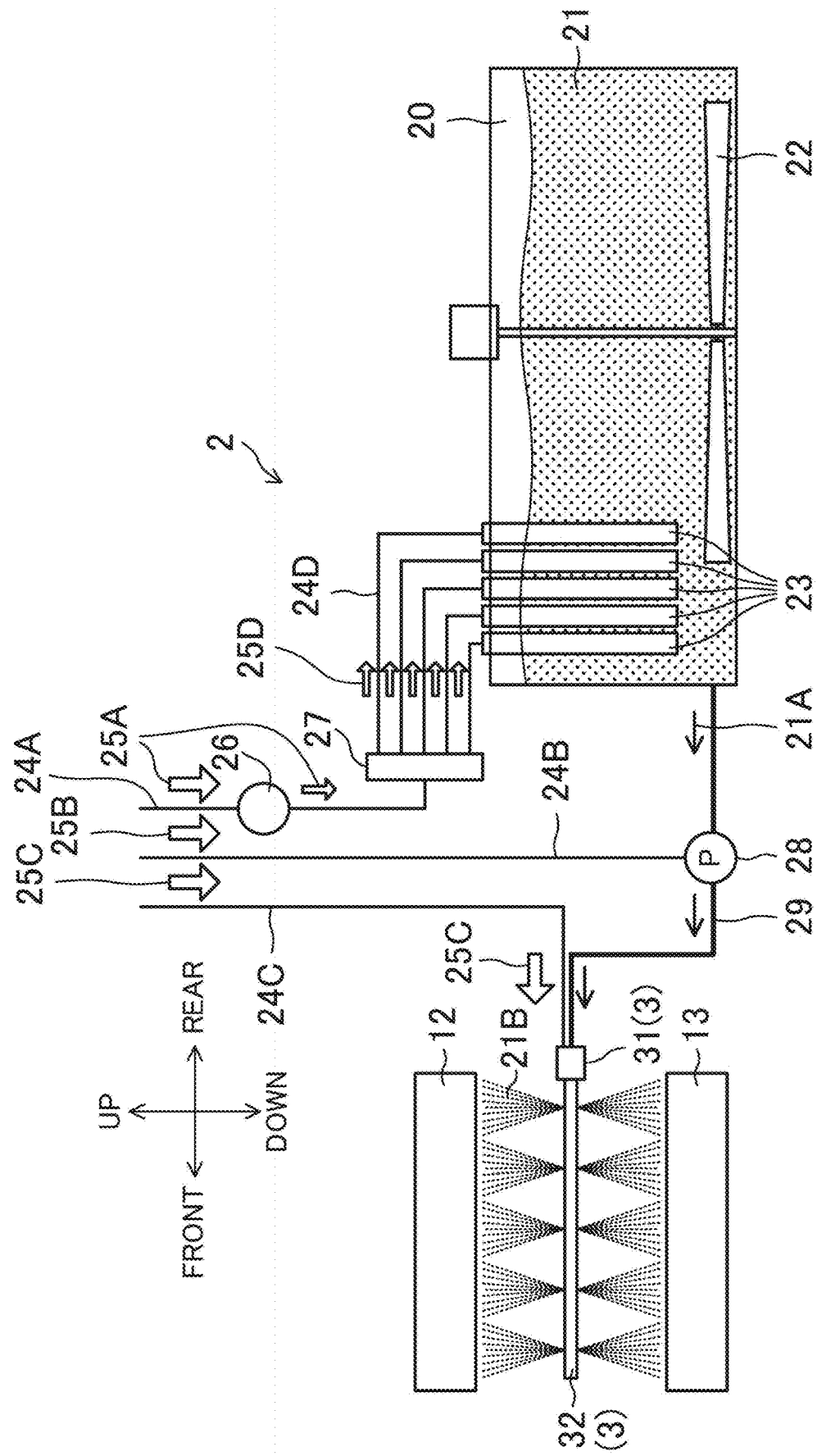
FIG. 8 is a view diagrammatically showing an application device for a release agent according to an embodiment.

As shown in FIG. 8, the application device 2 for the release agent according to this embodiment is a device for applying the release agent 21 to be described later to the surface of the die 1.

The application device 2 has a tank 20 (storage unit) for storing the release agent 21.

Inside the tank 20, placed is an agitator 22 (agitating means) for agitating the release agent 21 stored in the tank 20.

Inside the tank 20, also, placed are micronanobubble generators 23 (bubble generating means) for supplying micronanobubbles into the release agent 21 stored in the tank 20.

The application device 2 further has a release agent spray unit 3 (spraying means) for spraying the release agent 21 stored in the tank 20 onto the die 1.

[Application Method for Release Agent]

Figure 10:
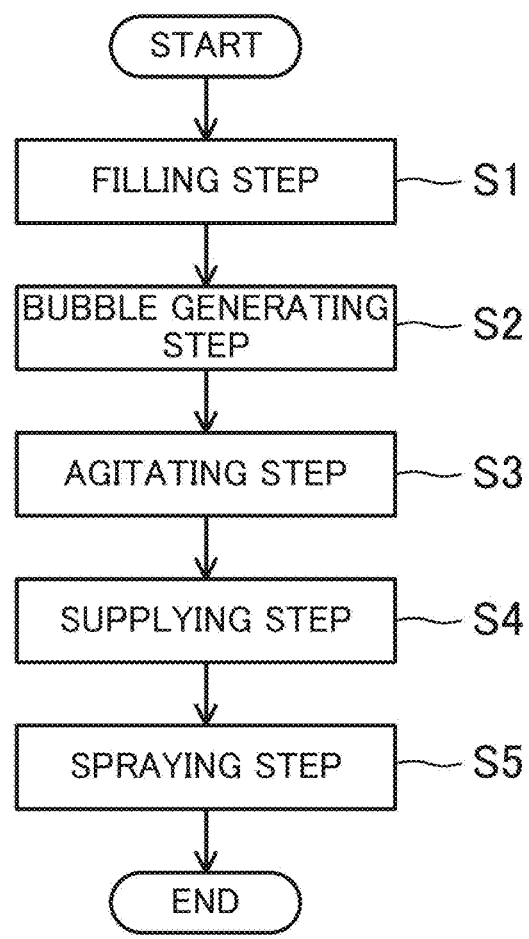
FIG. 10 is a flowchart for explaining a method of applying a release agent to a die using the application device for a release agent of FIG. 8.

As shown in FIG. 10, the application method for the release agent 21 according to this embodiment follows the procedure below.

First, in filling step S1, the tank 20 is filled with a release agent undiluted solution 210.

Then, in bubble generating step S2, micronanobubbles are generated in the release agent undiluted solution 210 by the micronanobubble generators 23.

Further, in agitating step S3, the release agent undiluted solution 210 is agitated by the agitator 22, thereby dispersing micronanobubbles 213 generated in the release agent undiluted solution 210 uniformly, to obtain the release agent 21. Note that the agitation of the release agent undiluted solution 210 in the agitating step S3 may be started before the start of the bubble generating step S2.

Thereafter, in supplying step S4, the release agent 21 is supplied to the release agent spray unit 3.

Then, in spraying step S5, the release agent 21 is sprayed onto the die 1 by the release agent spray unit 3. The spraying step S5 is performed for the rough die X, the finishing die Y, and the trimming die Z, for example, immediately after die opening subsequent to the press forming with the die 1 in the press forming step SIII described above.

While the application method for the release agent 21 according to this embodiment is performed using the application device 2 shown in FIG. 8, the device is not limited to the application device 2 shown in FIG. 8, but any other device having a similar configuration may be used.

[Tank]

The tank 20 is for storing the release agent 21 according to this embodiment. The release agent undiluted solution 210 is supplied into the tank 20 in the filling step S1. Then, with micronanobubbles being supplied into the release agent undiluted solution 210 by the micronanobubble generators 23 in the bubble generating step S2, the solution 210 is agitated by the agitator 22 in the agitating step S3, to prepare the release agent 21.

The tank 20 is only required to have a capacity capable of securing a sufficient supply amount of the release agent 21 for the size of the die 1 to which the release agent 21 is applied, especially the surface area of the portion of the die 1 to which the release agent 21 is applied. Specifically, the capacity of the tank 20 is preferably greater than or equal to 20 L and less than or equal to 5000 L, more preferably greater than or equal to 200 L and less than or equal to 4000 L, especially preferably greater than or equal to 1500 L and less than or equal to 2500 L, for example.

The tank 20 is provided with a release agent supply pipe 29 for supplying the release agent 21 from the tank 20 in the supplying step S4. The supply amount of the release agent 21 from the tank 20 can be changed appropriately depending on the size of the die 1, etc., but specifically, it is preferably greater than or equal to 3 L/min and less or equal to 30 L/min, more preferably greater than or equal to 5 L/min and less than or equal to 20 L/min, especially preferably greater than or equal to 8 L/min and less than or equal to 12 L/min.

A release agent undiluted solution 210 may be newly supplied into the tank 20 once the stored amount of the release agent 21 becomes below a given amount, for example. Otherwise, the tank 20 may be provided with piping for supply of the release agent undiluted solution 210, so that roughly the same amount of the release agent undiluted solution 210 as the supply amount of the release agent 21 may be supplied at all times to keep the stored amount of the release agent 21 in the tank 20 constant.

[Agitator]

The agitator 22 agitates the release agent 21 stored in the tank 20 at all times so that micronanobubbles supplied from the micronanobubble generators 23 placed inside the tank 20 should be dispersed uniformly into the release agent 21 at all times. The kind of the agitator 22 is not specifically limited, but any commercially available agitator may be placed in the tank 20.

[Micronanobubble Generator]

The micronanobubble generators 23 generate micronanobubbles into the release agent undiluted solution 210 stored in the tank 20 in the bubble generating step S2 and continue supplying micronanobubbles into the release agent 21. As the micronanobubble generators 23, commercially available ones can be used appropriately. For example, preferably usable are ones using a nonwoven fabric method in which pressurized gas is supplied to a nonwoven fabric made of a porous polymeric film, etc. to generate micronanobubbles through holes of the film. The gas constituting the micronanobubbles is preferably air from the standpoints of improving the safety and keeping the cost low.

The application device 2 is provided with air pipes 24A, 24B, 24C, and 24D (hereinafter collectively called air piping 24 in some cases) for supplying air to the components of the application device 2 as shown in FIG. 8.

Air 25A and 25D is supplied to the micronanobubble generators 23 through the air pipes 24A and 24D. A regulator 26 is placed on the air pipe 24A and can regulate the air pressure of the air 25A. A branching unit 27 is further placed on the air pipe 24A, branching the air pipe 24A into a plurality of air pipes 24D. The air 25A supplied through the air piping 24 is divided by the branching unit 27 to be supplied to the micronanobubble generators 23 as the air 25D through the air pipes 24D connected to the micronanobubble generators 23 as shown in FIG. 8.

The air pressure (air supply pressure) of the air supplied to the micronanobubble generators 23 is preferably greater than or equal to 0.03 MPa and less than or equal to 0.3 MPa, more preferably greater than or equal to 0.05 MPa and less than or equal to 0.25 MPa, especially preferably greater than or equal to 0.1 MPa and less than or equal to 0.2 MPa, from the standpoint of supplying a sufficient amount of micronanobubbles into the release agent 21.

The micronanobubble generators 23 are required to have a capability of supplying micronanobubbles so that the release agent 21 is filled with micronanobubbles at any time, considering the balance between the capacity of the tank 20, i.e., the capacity of the release agent 21 with which the tank 20 is filled and the supply amount of the release agent 21 to the release agent spray unit 3.

In this embodiment, a plurality of micronanobubble generators 23 are provided as shown in FIG. 8. It is possible to adjust the supply amount of micronanobubbles into the release agent 21 by increasing/decreasing the number of micronanobubble generators 23 depending on the micronanobubble supply capability of the micronanobubble generators 23. Note that a plurality of micronanobubble generators 23 may be provided as in this embodiment, or only one micronanobubble generator 23 having a large micronanobubble supply capability may be used.

The total supply amount of micronanobubbles (supply amount of micronanobubbles) supplied from a plurality of micronanobubble generators 23 into the release agent 21 is preferably greater than or equal to 1 L/min and less than or equal to 100 L/min, more preferably greater than or equal to 2 L/min and less than or equal to 50 L/min, especially preferably greater than or equal to 3 L/min and less than or equal to 30 L/min, from the standpoint of supplying a sufficient amount of micronanobubbles into the release agent 21.

[Release Agent Spray Unit]

The release agent spray unit 3 is for spraying the release agent 21 onto the die 1 in the spraying step S5. The release agent spray unit 3 is provided with an atomizing unit 31 that atomizes the release agent 21 by mixing air 25C with the release agent 21 supplied from the tank 20. The release agent spray unit 3 is also provided with a spray head 32 connected to the atomizing unit 31 and placed between the upper die 12 and lower die 13 of the die 1 for spraying the release agent 21 atomized by the atomizing unit 31 onto the surfaces of the upper die 12 and the lower die 13.

To the atomizing unit 31, connected is the release agent supply pipe 29 for supplying the release agent 21 from the tank 20 via a release agent supply pump 28. The release agent supply pump 28 is an air-driven pump, to which the air pipe 24B is connected to supply air 25B. A release agent 21A from the tank 20 is supplied to the atomizing unit 31 through the release agent supply pipe 29.

The supply pump pressure (supply pressure) to the release agent 21 by the release agent supply pump 28 in the supplying step S4 is preferably greater than or equal to 0.2 MPa and less than or equal to 10 MPa, more preferably greater than or equal to 0.3 MPa and less than or equal to 5 MPa, especially preferably greater than or equal to 0.4 MPa and less than or equal to 4 MPa, from the standpoint of supplying a sufficient amount of the release agent 21 onto the upper die 12 and the lower die 13. Note that the supply pump pressure can be changed appropriately depending on the kind, size, configuration, etc. of the die 1 to which the release agent 21 is applied.

Although not shown, the atomizing unit 31 has an inlet of the release agent 21 supplied through the release agent supply pipe 29 and a mixing section that mixes the air 25C supplied through the air pipe 24C with the release agent 21 introduced from the inlet. The release agent 21 is mixed with the air 25C and atomized in the mixing section.

The atomizing air pressure of the air 25C supplied to the atomizing unit 31 through the air pipe 24C is preferably greater than or equal to 0.10 MPa and less than or equal to 0.80 MPa, more preferably greater than or equal to 0.20 MPa and less than or equal to 0.70 MPa, especially preferably greater than or equal to 0.30 MPa and less than or equal to 0.50 MPa, from the standpoint of spraying the release agent 21 uniformly onto the upper die 12 and the lower die 13.

The spray head 32 is configured to be inserted between the upper die 12 and the lower die 13 immediately after die opening subsequent to the press forming with the die 1 and apply the atomized release agent 21 to the surfaces of the rough die X, the finishing die Y, and the trimming die Z.

From the standpoint of applying the release agent 21 uniformly to the entire surfaces of the upper die 12 and the lower die 13, the spray head 32 has a plurality of injection holes not shown, to allow the release agent 21 to be injected from these injection holes in a state of atomized particles. The configuration of the spray head 32 is not limited to that described above, but the injection amount, the injection rate, etc. may be made changeable for each injection hole, for example.

The Sauter mean diameter of the atomized particles of the release agent 21 sprayed from the release agent spray unit 3 is preferably greater than or equal to 10 μm and less than or equal to 30 μm, more preferably greater than or equal to 12 μm and less than or equal to 28 μm, especially preferably greater than or equal to 15 μm and less than or equal to 25 μm, from the standpoint of spraying the release agent 21 uniformly onto the die 1.

<Release Agent>

Figure 9:
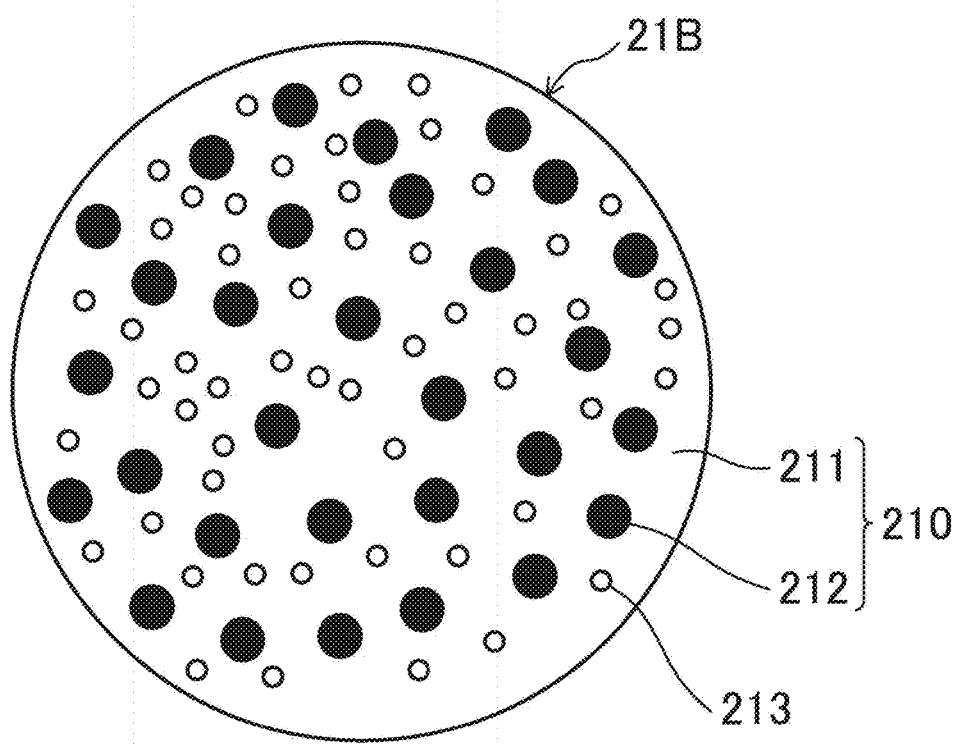
FIG. 9 is a view diagrammatically showing a droplet of the release agent sprayed from an injection nozzle of the application device for a release agent of FIG. 8.

FIG. 9 is an enlarged diagrammatic view of a droplet 21B of the release agent 21 injected from the spray head 32. The droplet 21B of the release agent 21 is constituted by the release agent undiluted solution 210 and the micronanobubbles 213 dispersed in the release agent undiluted solution 210 as shown in FIG. 9.

—Release Agent Undiluted Solution—

As the release agent undiluted solution 210, a commercially available release agent used for hot-forging dies and a dilution of such a commercially available release agent with water can be used. Specifically, for example, a water-soluble graphite-based release agent having graphite particles 212 dispersed in water 211 as a solvent as shown in FIG. 9 and a water-soluble white release agent containing no graphite can be used. The water-soluble white release agent is a water-soluble non-graphite release agent made by blending water-soluble polymers, inorganic salts, etc., such as sodium polyacrylate (PA-Na) and carboxymethyl cellulose sodium (CMC-Na), in carboxylic salt as a base, for example, and adding a solid lubricant as required.

—Micronanobubbles—

The release agent 21 according to this embodiment has a feature of containing micronanobubbles 213.

As used herein, the "micronanobubble" refers to a fine bubble, where the diameter of the fine bubble as regarded as a perfect sphere is less than or equal to 200 μm. As used herein, when the fine bubble is regarded as a perfect sphere, the diameter of the perfect sphere is referred to as the "diameter of the micronanobubble." Also, as used herein, when the fine bubble is regarded as a perfect sphere, the volume of the perfect sphere is referred to as the "volume of the micronanobubble." The "content of micronanobubbles in the release agent" refers to a value obtained by calculating the volume of micronanobubbles contained in a unit volume of the release agent, expressed by percent by volume (vol %).

The micronanobubbles are supplied into the release agent 21 by the micronanobubble generators 23 as described above in the bubble generating step S2.

The diameters of the micronanobubbles are preferably less than or equal to 200 μm, more preferably less than or equal to 150 μm, especially preferably less than or equal to 50 μm, and preferably greater than or equal to 0.1 μm, more preferably greater than or equal to 0.5 μm, especially preferably greater than or equal to 0.6 μm, from the standpoint of enhancing the cooling capability of the release agent 21.

The content (vol %) of the micronanobubbles contained in the release agent 21 is preferably less than or equal to 10 vol %, more preferably less than or equal to 8 vol %, especially preferably less than or equal to 5 vol %, and preferably greater than or equal to 0.1 vol %, more preferably greater than or equal to 0.15 vol %, especially preferably greater than or equal to 0.2 vol %, from the standpoint of enhancing the cooling capability of the release agent 21.

Since the release agent 21 according to this embodiment contains micronanobubbles, it decreases in surface tension and improves in wettability. This increases the contact area with the die. Also, micronanobubbles have a nature of staying in water since the bubbles are so small that the buoyancy acting on the bubbles decreases. Therefore, in addition to evaporation of the solvent component from the contact face between the droplet of the release agent 21 and the die surface, boiling of the solvent component advances starting from the micronanobubbles in the droplet of the release agent 21. In this way, vaporization of the solvent component of the release agent 21 is accelerated, improving the capability of cooling the die by the release agent.

<Release Agent Layer>

In the release agent 21 sprayed onto the high-temperature die 1 by the application device 2, the solvent component such as water, for example, is vaporized, whereby a release agent layer is formed. The release agent layer has a role of enhancing the lubricity and releasability of the die 1.

According to the release agent 21 of this embodiment, since micronanobubbles are contained, the vaporization amount of the release agent 21 increases, thereby increasing the cooling capability. Therefore, variations in the film thickness of the release agent layer are reduced, whereby a more uniform release agent layer can be obtained.

The average film thickness of the release agent layer is preferably greater than or equal to 2.3 µm and less than or equal to 15 µm, more preferably greater than or equal to 3.7 µm and less than or equal to 12 µm, especially preferably greater than or equal to 5.0 µm and less than or equal to 10.0 µm, from the standpoint of enhancing the lubricity and releasability of the die 1.

EXAMPLES

Examples carried out concretely will be described hereinafter.

<Measurement of Particle Sizes of Atomized Particles of Release Agent>

The particle sizes of atomized particles sprayed from the release agent spray unit 3 were measured using a phase Doppler laser particle analyzer. Specifically, the particle sizes of atomized particles of the release agent 21 at a position apart from the spray head 32 by 200 mm, i.e., by a distance equivalent to the distance from the spray head 32 to the die surface onto which the release agent 21 was to be sprayed were measured, to calculate the Sauter mean diameter.

Table 1 shows the results of the Sauter mean diameters of atomized particles of the release agent 21. Note that the supply pump pressure to the release agent 21 is 1.0 MPa and the atomizing air pressure of the air 25C is 0.45 MPa.

TABLE 1

|  | Particle size [µm] |
| --- | --- |
| Maximum | 25.1 |
| Minimum | 18.2 |
| Average | 22.7 |
| Max − Min difference | 6.9 |

In cooling capability evaluation experiment 2 for the release agent to be described later, the release agent 21 as atomized particles having the particle sizes shown in Table 1 was sprayed onto the die 1. As will be described later, it has been found that the release agent 21 was applied to the die surface in a favorable applied state, forming a uniform release agent layer having a sufficient thickness.

<Cooling Capability Evaluation Experiment 1 for Release Agent>

Example 1

—Preparation of Micronanobubble-Containing Release Agent—

Air was sent into a commercially available water-soluble graphite-based release agent (Deltaforge F850 produced by Henkel AG & Co.) with an air pressure of 0.15 MPa and bubbled for one hour, using a nanobubble generator (Foamest 201 manufactured by Nac Co., Ltd.), to prepare the release agent 21 containing micronanobubbles.

—Experiment Apparatus—

Figure 11:
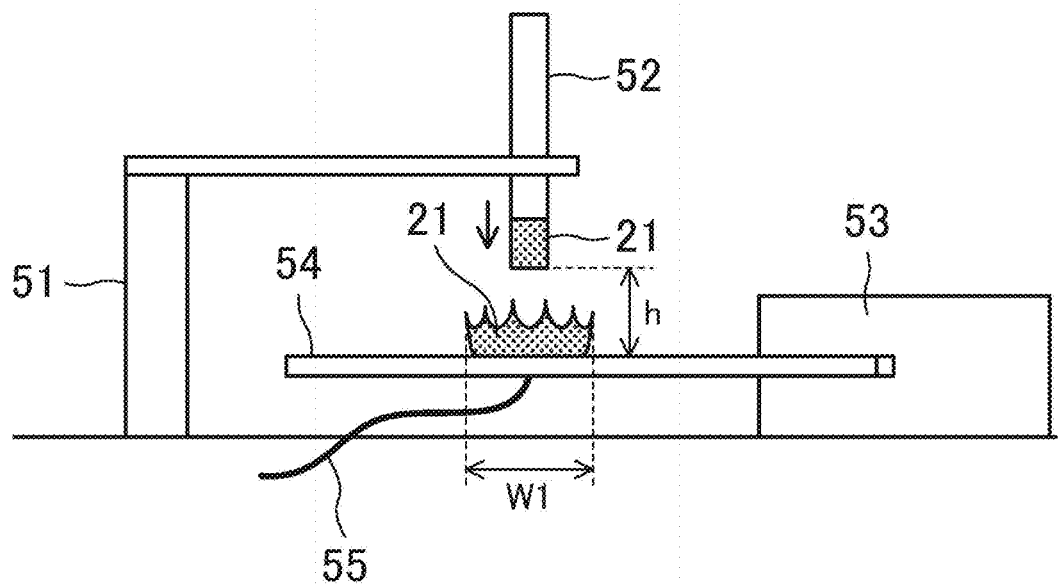
FIG. 11 is a view diagrammatically showing the configuration of an experiment apparatus for evaluating the cooling capability of a release agent.

As shown in FIG. 11, a pipet 52 was attached to a stand 51. An iron plate 54 attached to a ceramic base 53 was placed under the pipet 52 so that the distance h from the tip of the pipet 52 to the iron plate 54 was 20 mm. A thermocouple 55 was attached to the back of the iron plate 54 at a position near underneath the pipet 52.

—Experiment A—

A temperature change of the iron plate 54 at the time when a droplet of 0.3 mL of the release agent 21 was dropped from the pipet 52 onto the iron plate 54 heated at 260° C. was measured.

—Experiment B—

The behavior of the droplet before and after the drop of the release agent 21 was shot with a high-speed camera, and the width W1 of the droplet immediately after the drop, i.e., 0.5 seconds after the arrival of the droplet at the iron plate 54 was measured.

—Experiment C—

Figure 12:
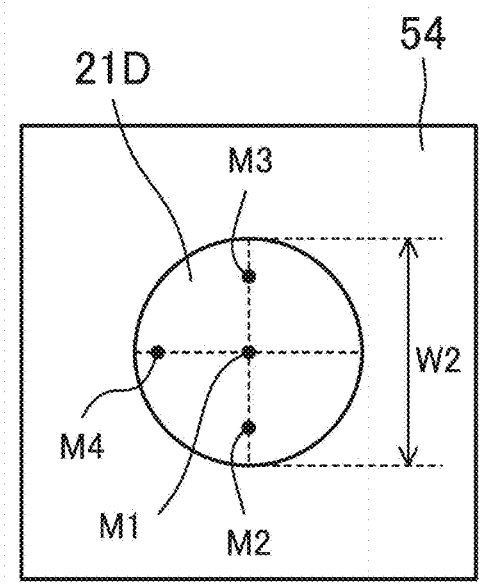
FIG. 12 is a plan view diagrammatically showing a release agent layer formed by a droplet of the release agent dropped onto an iron plate by the experiment apparatus of FIG. 11.

The water content of the release agent 21 was vaporized approximately 50 seconds after the drop of the release agent 21, forming a release agent layer 21D as shown in FIG. 12. After sufficient cooling of the iron plate 54, the size and film thickness of the release agent layer 21D were measured. Specifically, as shown in FIG. 12, the width W2 of the release agent layer 21D and the film thicknesses of the release agent layer 21D at points M1 to M4 were measured. Note that M1 is the center point of the release agent layer 21D when regarded as a circle, M2 and M3 are points on a diameter line of the release agent layer 21D passing through M1 at positions inside the outer circumference by approximately ⅙ of the diameter, and M4 is similarly a point inside the outer circumference by approximately 1/10 of the diameter. The film thicknesses were measured using a commercially available film thickness meter (Electromagnetic coating thickness tester LE373 manufactured by Kett Electric Laboratory).

Example 2

The iron plate 54 was heated to 200° C., and only Experiment A was carried out as in Example 1.

Comparative Examples 1 and 2

In Comparative Examples 1 and 2, the experiments were carried out as in Examples 1 and 2, respectively, except that a commercially available water-soluble graphite-based release agent was used as it was without performing bubbling by the micronanobubble generator.

Figure 13:
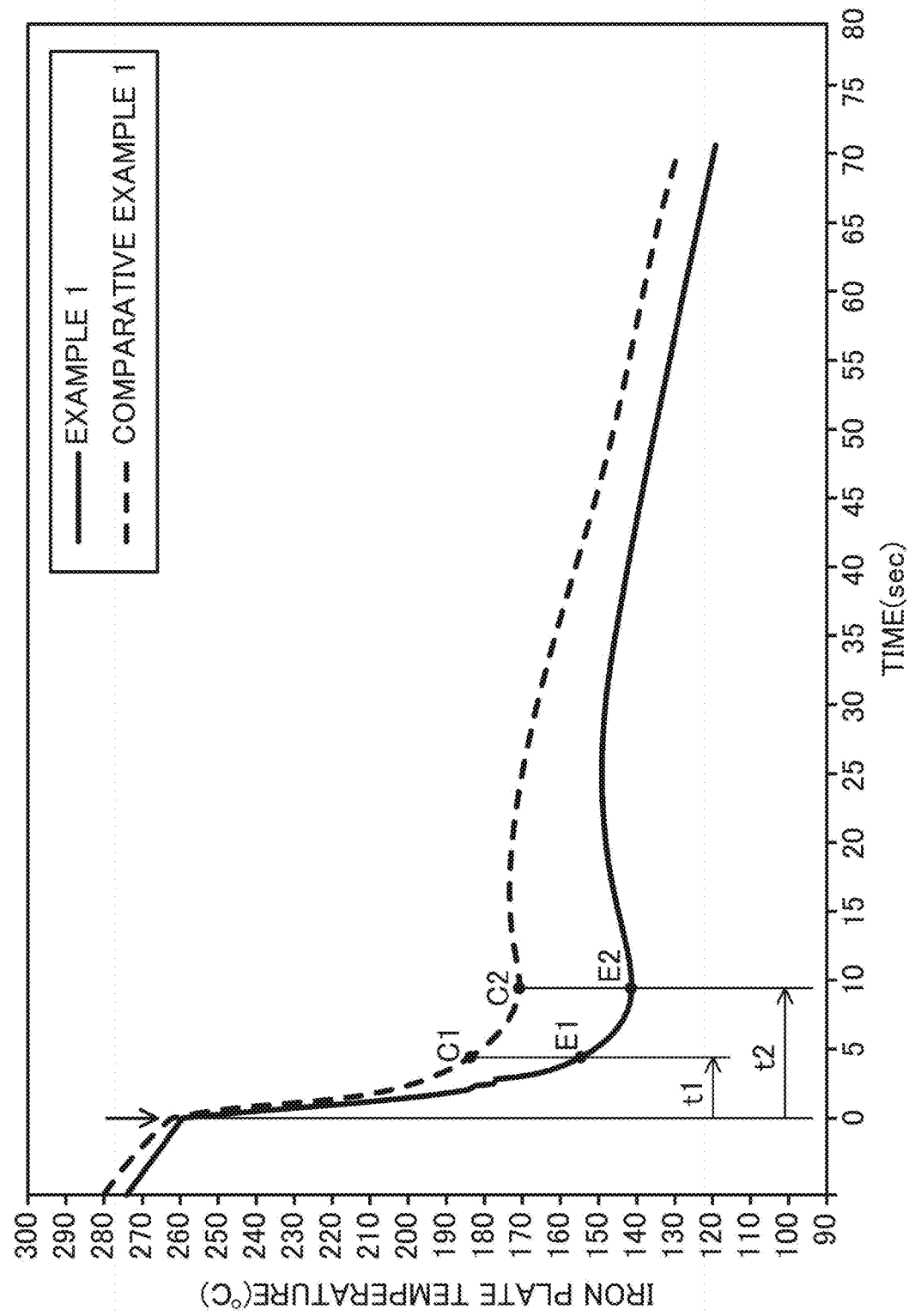
FIG. 13 is a graph showing the cooling capability of the release agent for the iron plate with a temperature of 260° C., measured using the experiment apparatus of FIG. 11
Figure 14:
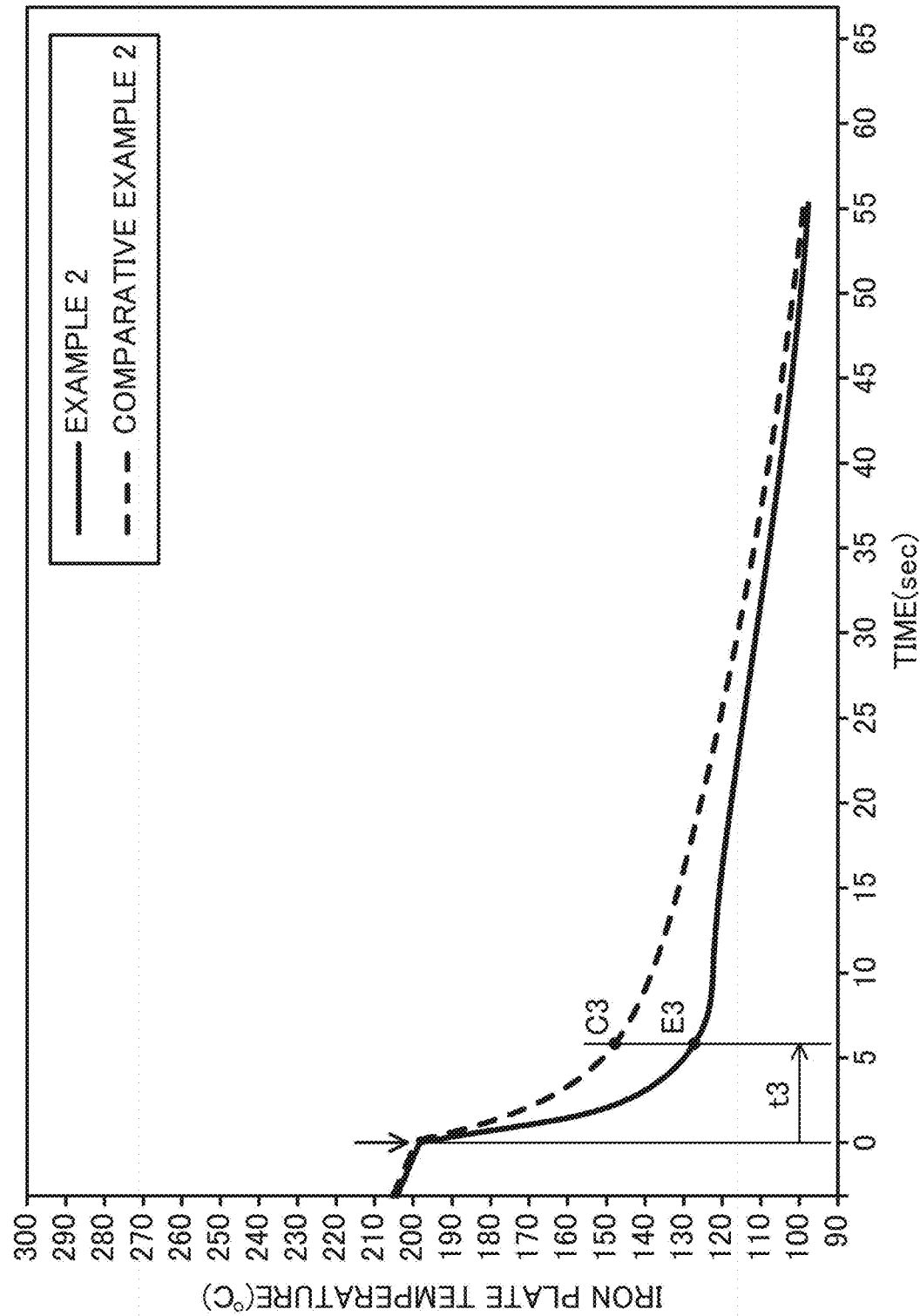
FIG. 14 is a graph showing the cooling capability of the release agent for the iron plate with a temperature of 200° C., measured using the experiment apparatus of FIG. 11.

The results of Experiment A of Examples 1 and 2 and Comparative Examples 1 and 2 are shown in FIGS. 13 and 14 and Tables 2 and 3. Also, the results of Experiments B and C of Example 1 and Comparative Example 1 are shown in Table 4. Note that the position indicated by the arrow in FIGS. 13 and 14 denotes the time at which a droplet of the release agent was dropped, which is 0 second.

TABLE 2

|  | | Example 1 | | Comparative Example 1 | |
| --- | --- | --- | --- | --- | --- |
|  | | Iron plate temp. [° C.] | Cooling rate [° C./sec] | Iron plate temp. [° C.] | Cooling rate [° C./sec] |
| Time [sec] | 0 (at drop) | 260 | — | 264 | — |
|  | 4.9 (t1) | 154 (E1) | 22 | 185 (C1) | 16 |
|  | 9.6 (t2) | 141 (E2) | 12 | 171 (C2) | 10 |

TABLE 3

|  | | Example 2 | | Comparative Example 2 | |
| --- | --- | --- | --- | --- | --- |
|  | | Iron plate temp. [° C.] | Cooling rate [° C./sec] | Iron plate temp. [° C.] | Cooling rate [° C./sec] |
| Time [sec] | 0 (at drop) | 200 | — | 201 | — |
|  | 4.4 (t3) | 136 (E3) | 15 | 158 (C3) | 10 |

TABLE 4

|  |  |  | Example 1 | Comparative Example 1 |
| --- | --- | --- | --- | --- |
|  | Width W1 of droplet [mm] | | 28 | 20 |
| Release agent layer 21D | Width W2 [mm] | | 25 | 20 |
|  | Film thickness [μm] | M1 | 6.1 | 4.4 |
|  |  | M2 | 6.4 | 6.9 |
|  |  | M3 | 6.8 | 11.8 |
|  |  | M4 | 6.3 | 7.9 |
|  | Max film thickness difference [μm] | M3 − M1 | 0.7 | 7.4 |

—Results of Experiment A—

As shown in FIG. 13 and Table 2, in Example 1 in which the temperature of the iron plate was 260° C., the iron plate was cooled by 106° C. until time t1 (4.9 seconds). Dividing 106° C. by time t1, the cooling temperature per unit time, i.e., the cooling rate, until time t1 is 22° C./second. Likewise, the iron plate was cooled by 119° C. until time t2 (9.6 seconds), and the cooling rate is 12° C./second.

In Comparative Example 1 in which the temperature of the iron plate was 264° C., the iron plate was cooled by 79° C. and 93° C. until time t1 and time t2, respectively, and the cooling rates are 16° C./second and 10° C./second, respectively.

As described above, it is found that, in the release agent 21 containing micronanobubbles in Example 1, the cooling rate of the iron plate 54 has improved at both times t1 and t2, compared with the conventional release agent in Comparative Example 1, and the cooling capability has improved by approximately 37% at time t1.

Also, as shown in FIG. 14 and Table 3, in Example 2 in which the temperature of the iron plate was 200° C. and Comparative Example 2 in which the temperature of the iron plate was 201° C., the iron plate was cooled by 64° C. and 43° C., respectively, until time t3 (4.4 seconds), and the cooling rates are 15° C./second and 10° C./second, respectively.

As described above, it is found that, in the release agent 21 containing micronanobubbles in Example 2, the cooling capability has improved by approximately 50% at time t3 compared with the conventional release agent in Comparative Example 2.

From the results described above, it is found that the release agent 21 according to this embodiment, which contains micronanobubbles, has improved in cooling capability especially in approximately 5 minutes after the drop.

—Results of Experiments B and C—

As is found from Table 4, the width W1 of the droplet and the width W2 of the release agent layer 21D are both wider in Example 1 than in Comparative Example 1. From these results, it is found that the release agent 21 containing micronanobubbles has improved in wettability compared with the conventional release agent.

Also, as for the film thickness of the release agent layer 21D, while the maximum film thickness difference is 7.4 μm in Comparative Example 1, it is 0.7 μm in Example 1. It is therefore found that variations in film thickness have been greatly reduced.

—Examination—

Figure 21:
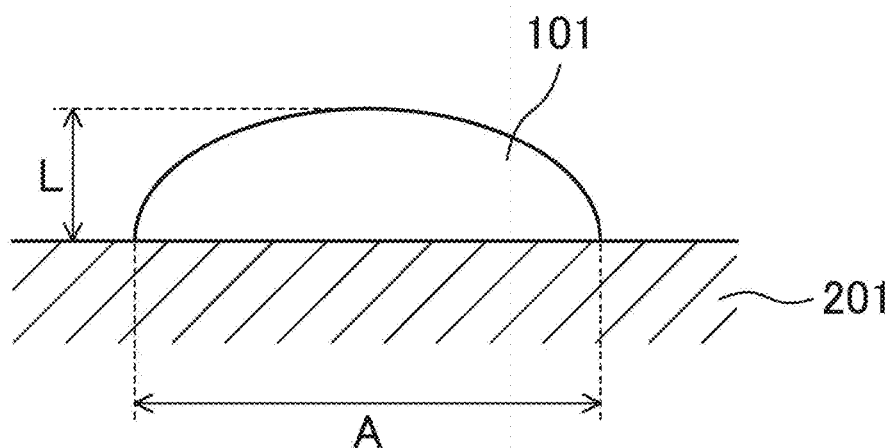
FIG. 21 is a view diagrammatically showing a droplet dropped onto a metal plate.

FIG. 21 schematically shows the state where a droplet 101, for example, is in contact with a metal plate 201. The heat quantity Q per unit time transferred from the metal plate 201 to the droplet 101 is expressed by Equation (1)

$$Q = \lambda A \Delta T / L \quad (1)$$

where $\lambda$, $A$, $\Delta T$, and $L$ are respectively the thermal conductivity of the droplet 101, the contact area between the metal plate 201 and the droplet 101, the temperature difference therebetween, and the heat transfer distance.

As is found from equation (1), it is considered that the cooling capability of the droplet 101 for the metal plate 201 improves as the contact area A of the droplet 101 in contact with the metal plate 201 is greater or the heat transfer distance L that is the height of the droplet 101 is smaller.

Figure 22:
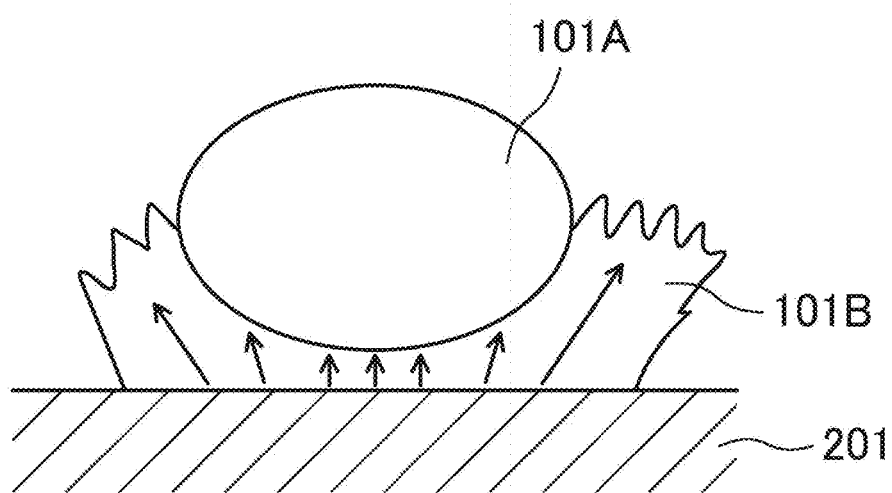
FIG. 22 is a view for explaining the Leidenfrost phenomenon.

FIG. 22 diagrammatically shows the Leidenfrost phenomenon that occurs when the droplet 101 is dropped onto the high-temperature metal plate 201. When the temperature of the metal plate 201 is very high, the droplet rapidly evaporates from the contact portion with the metal plate 201, causing an updraft of steam 101B. Due to the updraft of the steam 101B, a part or the entire of a droplet portion 101A becomes a state like being lifted above the metal plate 201, reducing the contact area between the droplet portion 101A and the metal plate 201. This impedes the heat transfer from the metal plate 201 to the droplet portion 101A, reducing the cooling capability of the droplet portion 101A for the metal plate 201.

As is found from the results of Experiments A to C, the droplet of the release agent 21 according to this embodiment, which contains micronanobubbles, decreases in surface tension and improves in wettability. This increases the contact area with the die. In this way, it is considered that the cooling capability of the release agent for the die improves.

Also, micronanobubbles have a nature of staying in water since the bubbles are so small that the buoyancy acting on the bubbles decreases. Therefore, it is considered that, when the droplet of the release agent 21 comes into contact with the high-temperature die surface, the micronanobubbles 213 present in the droplet of the release agent 21 serve as starting points of boiling of the water 211, like boiling tips, for example. Thus, in addition to evaporation of the water 211 from the contact face between the droplet and the die, boiling of the water 211 advances with the micronanobubbles 213 serving as the starting points. Therefore, it is considered that, having micronanobubbles, the vaporization amount of the water 211 increases, compared with the conventional release agent containing no micronanobubbles, improving the cooling capability for the die surface.

Since the vaporization amount of the release agent 21 increases and this increases the cooling capability, it is found that variations in the film thickness of the release agent layer 21D are reduced, whereby a more uniform release agent layer is obtained.

—Cooling Capability Evaluation Experiment 2 for Release Agent—

Example 3

Water was added to a commercially available water-soluble graphite-based release agent (Deltaforge F850 produced by Henkel AG & Co.) and mixed to have a specific gravity of 1.0075 as measured by a gravimeter. The tank 20 was filled with the resultant solution, and the release agent 21 was prepared using the application device 2 provided with five micronanobubble generators (Foamest 201 manufactured by Nac Co., Ltd.). Air was sent into the five micronanobubble generators under an air pressure of 0.15 MPa. The total supply amount of micronanobubbles supplied from the micronanobubble generators into the release agent 21 was 3.5 L/minute.

For the rough lower die 131 shown in FIG. 7, the die surface temperature T1 [° C.] immediately after the rough forming of the steel material K and the die surface temperature T2 [° C.] immediately after the spraying of the release agent 21 by the application device 2 were measured with the radiation thermometer described above. The cooling performance was evaluated by calculating $\tau$ [° C./sec] expressed by Equation (2) below as the die cooling temperature per unit time of application of the release agent 21

$$\tau = (T1 - T2)/t \quad (2)$$

where t [sec] is the application time of the release agent 21.

Note that the spraying of the release agent 21 was performed under the conditions indicated in the measurement of the particle sizes of atomized particles of the release agent described above, i.e., the conditions under which the particle sizes of atomized particles shown in Table 1 were obtained, where the supply pump pressure to the release agent 21 was 1.0 MPa and the atomizing air pressure of the air 25C was 0.45 MPa.

Comparative Example 3

In Comparative Example 3, the experiment was carried out as in Example 3, except that a commercially available water-soluble graphite-based release agent was used as it was without performing bubbling by the micronanobubble generators.

Figure 15:
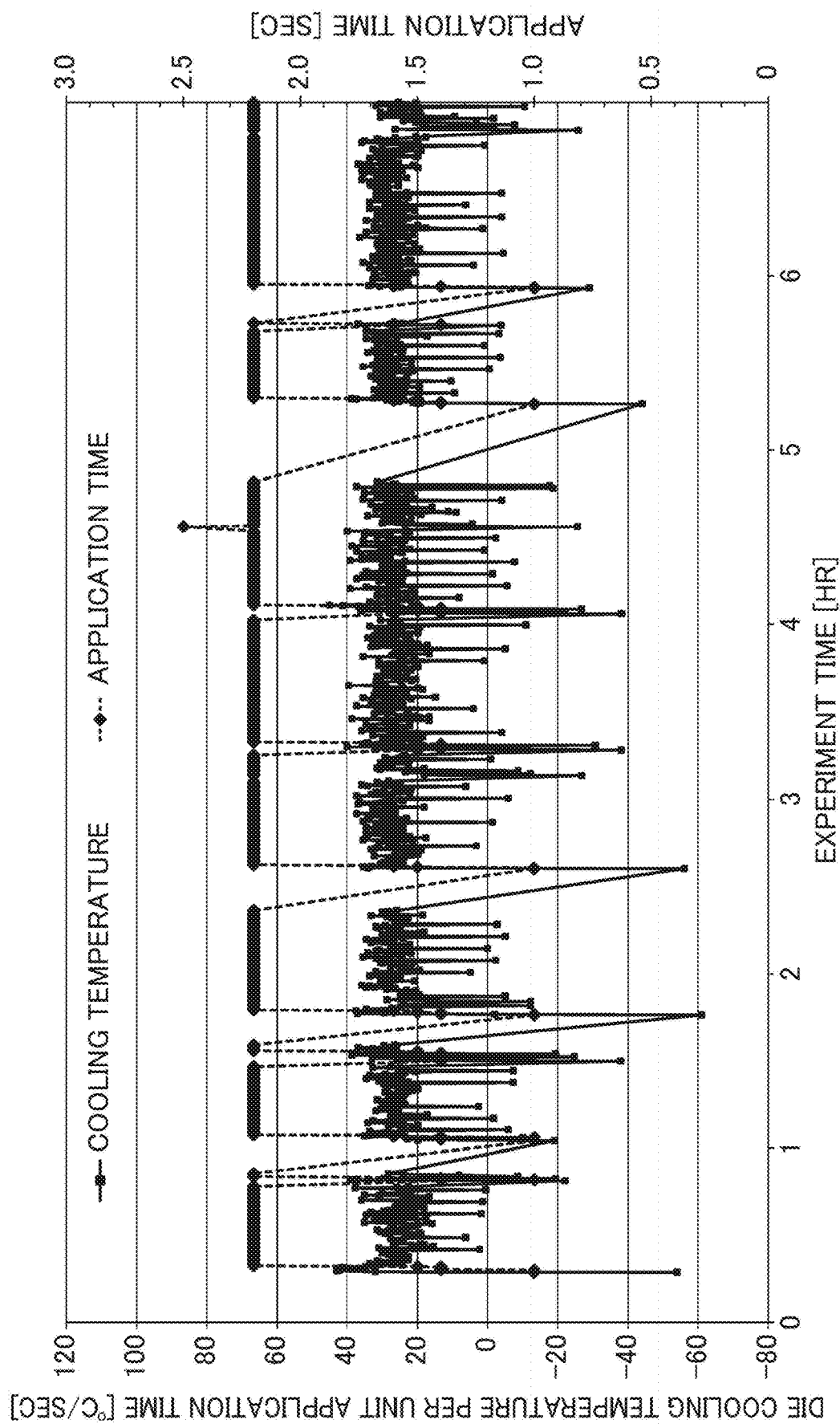
FIG. 15 is a graph showing the die cooling temperature per unit application time observed when a conventional release agent was sprayed onto the rough lower die of FIG. 7.
Figure 16:
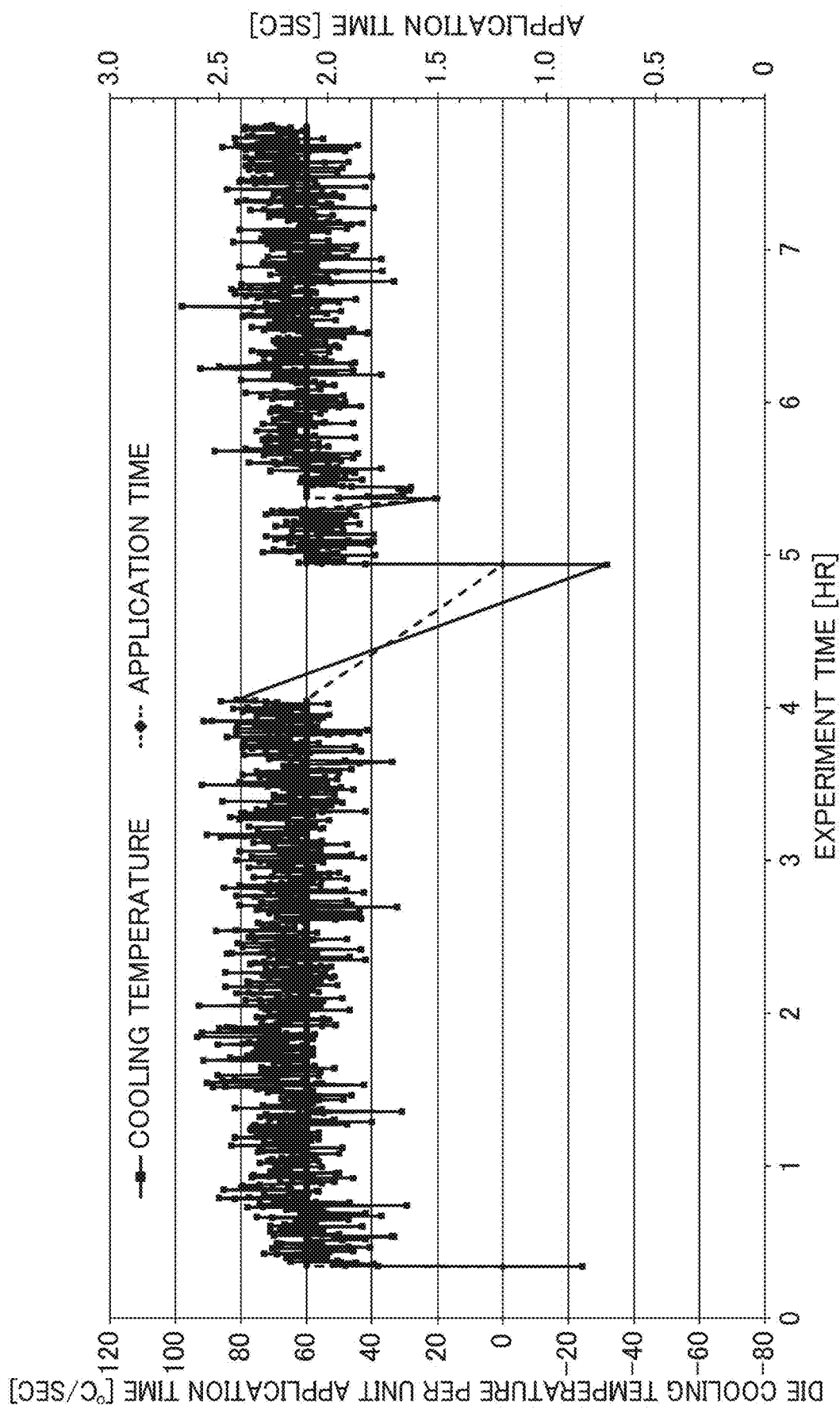
FIG. 16 is a graph showing the die cooling temperature per unit application time observed when a release agent according to an embodiment was sprayed onto the rough lower die of FIG. 7.

The results of Comparative Example 3 and Example 3 are shown in FIGS. 15 and 16, respectively. Note that the rough forming and the application of the release agent following the rough forming were performed a plurality of times in the experiment time over several hours, and measurement was performed for each time of rough forming and application of release agent. FIGS. 15 and 16 are graphs plotting the application time t and the die cooling temperature $\tau$ [° C./sec] per unit application time for each measurement in the experiment time of several hours.

As shown in FIG. 15, in Comparative Example 3, the application time t is approximately 2.2 seconds. The average value of the die cooling temperature $\tau$ per unit time in the experiment time from 1 hour to 6 hours was 24.7° C./second. Even when the application time was 2.2 seconds, the die cooling temperature $\tau$ per unit time was below 0° C./second in some cases. The die cooling temperature $\tau$ per unit time being below 0° C./second indicates that the rough lower die 131 has not been cooled at all even with application of the release agent.

On the contrary, as shown in FIG. 16, in Example 3, the application time t is approximately 2.1 seconds. The average value of the die cooling temperature $\tau$ per unit time in the experiment time from 1 hour to 4 hours and from 5 hours to 7 hours was 63.2° C./second. Also, during the time when the rough forming and the application of the release agent were being performed in the experiment time from 1 hour to 4 hours and from 5 hours to 7 hours, the die cooling temperature $\tau$ per unit time never fell below 0° C./second, unlike Comparative Example 3.

From the results described above, it is found that the release agent 21 containing micronanobubbles according to this embodiment has improved in cooling capability by approximately 2.6 times, in terms of the die cooling temperature $\tau$ per unit time, compared with the conventional release agent.

—Measurement of Film Thickness of Release Agent Layer—

Example 4

The film thickness of the release agent layer formed on the surface of the rough lower die 131 to which the release agent was applied in Example 3 was measured with a commercially available film thickness meter (Electromagnetic coating thickness tester LE373 manufactured by Kett Electric Laboratory). The film thickness measurement was performed at sites X1 to X8 of the rough lower die 131 shown in FIG. 7.

Comparative Example 4

The film thickness of the release agent layer formed on the surface of the rough lower die 131 to which the release agent was applied in Comparative Example 3 was measured.

Table 5 shows the results of Example 4 and Comparative Example 4.

TABLE 5

| Site of rough lower | Film thickness of release agent layer (μm) | |
|---|---|---|
| die 131 (FIG. 7) | Example 4 | Comparative Example 4 |
| X1 | 4.7 | 3.5 |
| X2 | 6.7 | 3.5 |
| X3 | 5.8 | 2.6 |
| X4 | 7.3 | 3.6 |
| X5 | 6.7 | 3.8 |
| X6 | 6.2 | 2.8 |
| X7 | 6.5 | 2.5 |
| X8 | 10.3 | 2.3 |
| Average | 6.8 | 3.1 |

As shown in Table 5, it is found that, in Comparative Example 4, while the average of the film thicknesses at X1 to X8 is 3.1 μm, the film thickness is small on the rear side, especially at X7 and X8.

In the crankshaft C shown in FIGS. 1 and 2, conventionally, underfill defect due to insufficient filling of the steel material K tended to occur in the counterweight CW8, for example, on the rear side. That is, the following underfill defect occurred: while the carved size corresponding to the width of the counterweight CW8 formed with the rough upper die 121 and the rough lower die 131 was 120 mm, the width of the counterweight CW8 of the forged crankshaft C was approximately 117 mm.

The above underfill defect is considered to have occurred because, as is found from the results of Comparative Example 4 in Table 5, the film thickness of the release agent layer becomes smaller on the rear side of the rough upper die 121 and the rough lower die 131 shown in FIGS. 6 and 7 than on the front side thereof.

The reason why the film thickness of the release agent layer is smaller on the rear side of the rough upper die 121 and the rough lower die 131 than on the front side thereof is considered related to the surface temperature of the die 1.

Specifically, it has been found that the die surface temperature immediately after the rough forming with the rough upper die 121 and the rough lower die 131 shown in FIGS. 6 and 7 becomes approximately 200° C. to approximately 400° C. Further, the following findings have been obtained: while the temperature is approximately 200° C. to approximately 350° C. on the front side of the rough upper die 121 and the rough lower die 131, it is approximately 300° C. to approximately 400° C. on the rear side, indicating that the die surface temperature is higher on the rear side than on the front side.

It is considered that, when the die surface temperature varies with the site of the rough upper die 121 and the rough lower die 131, the Leidenfrost phenomenon tends to occur on the rear side high in die surface temperature, reducing the cooling capability of the release agent for the die surface. This makes the film thickness of the release agent layer smaller on the rear side of the die than on the front side, and eventually causes reduction in the lubricity of the die surface. Thus, since the friction resistance of the die surface increases, insufficient filling of the steel material K is considered to occur on the rear side of the crankshaft C shown in FIGS. 1 and 2, e.g., in the counterweight CW8, etc.

As shown in Example 4 in Table 5, using the release agent 21 containing micronanobubbles according to this embodiment, it is found that the average of the film thicknesses at X1 to X8 has increased to 6.8 μm and the film thicknesses at X7 and X8 have increased to 6.5 μm and 10.3 respectively.

Actually, in forging of the crankshaft C, when using the release agent in Example 4, the die was filled with the steel material K up to 120 mm as the carved size of the rough upper die 121 and the rough lower die 131 for the counterweight CW8, whereby underfill defect hardly occurred in the counterweight CW8.

In Example 4, where micronanobubbles are contained in the release agent 21, it is considered that the cooling capability of the release agent for the die surface has improved, whereby cooling of the die surface has been accelerated even on the rear side of the rough upper die 121 and the rough lower die 131. Thus, it is considered that, since the film thickness of the release agent layer has become sufficiently large, the occurrence of underfill defect in the counterweight CW8 has reduced.

<Content of Micronanobubbles Contained in Micronanobubble Water>

In order to evaluate the content of micronanobubbles contained in the release agent, the bubble volume per unit volume in water containing micronanobubbles, i.e., micronanobubble water was measured. Specifically, since micronanobubbles that are negatively charged convect in water, the micronanobubble water was solidified with gelatin to prepare a specimen of the micronanobubble water, and the sizes of micronanobubbles contained in the specimen were measured with an inverted microscope. The experiment procedures are as follows.

Experiment Example 1

First, a micronanobubble generator was immersed in water and subjected to bubbling for 1 hour, thereby preparing micronanobubble water. To 50 g of this micronanobubble water, 5 g of commercially available gelatin (Morinaga cook gelatin produced by Morinaga Milk Industry Co., Ltd.) dissolved in 15 g of approximately 80° C. hot water was added and agitated, and then cooled in a refrigerator of approximately 10° C. for 2 hours.

Figure 17:
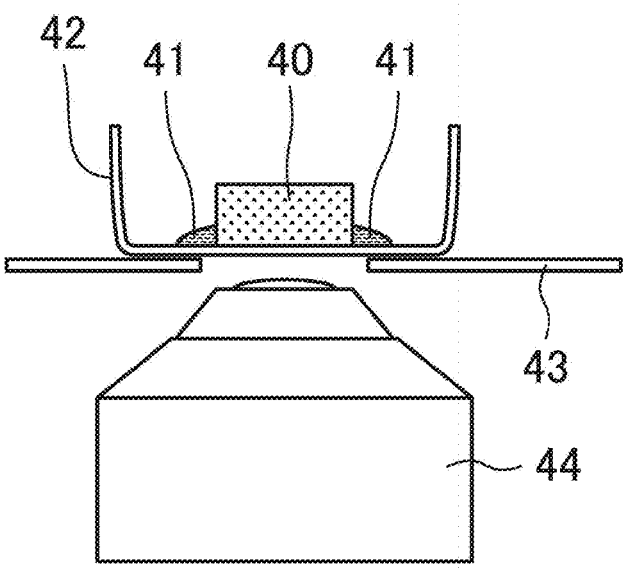
FIG. 17 is a view diagrammatically showing how micronanobubble water solidified by gelatin is subjected to observation experiment with an inverted microscope.

A specimen 40 of approximately 15 mm×15 mm×10 mm was taken from the thus-prepared micronanobubble water jelly, and placed on a petri dish 42 as shown in FIG. 17. The specimen 40 was brought into intimate contact with the petri dish 42, and a water droplet 41 for intimate contact was dropped onto the periphery of the specimen 40 for prevention of scattering of light to ease observation. The sizes of micronanobubbles contained in the specimen 40 were then measured with an optical microscope (GX41 manufactured by Olympus Corporation). Note that the reference character 44 in FIG. 17 denotes an objective lens of the optical microscope GX41 (inverted microscope). In this experiment, microbubbles having a diameter greater than or equal to 2 μm and less than 1000 μm were observed with the optical microscope GX41.

Figure 18:
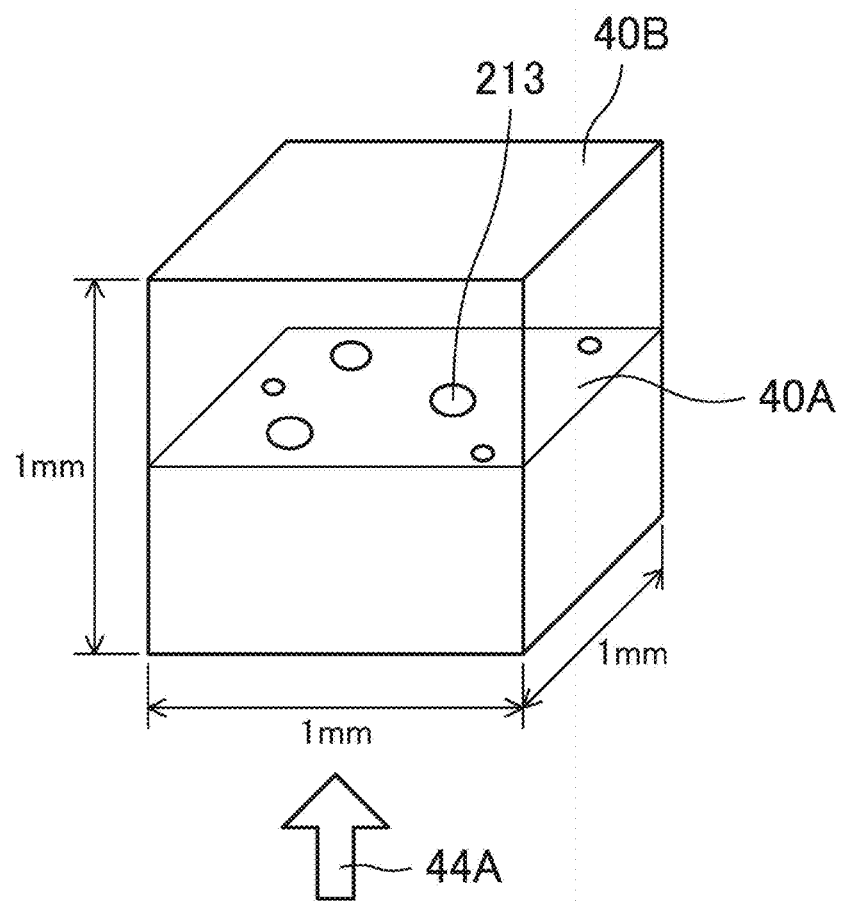
FIG. 18 is a view for explaining a method of determining the content of micronanobubbles included in the micronanobubble water from an optical microscope image obtained by the observation experiment in FIG. 17.
Figure 19:
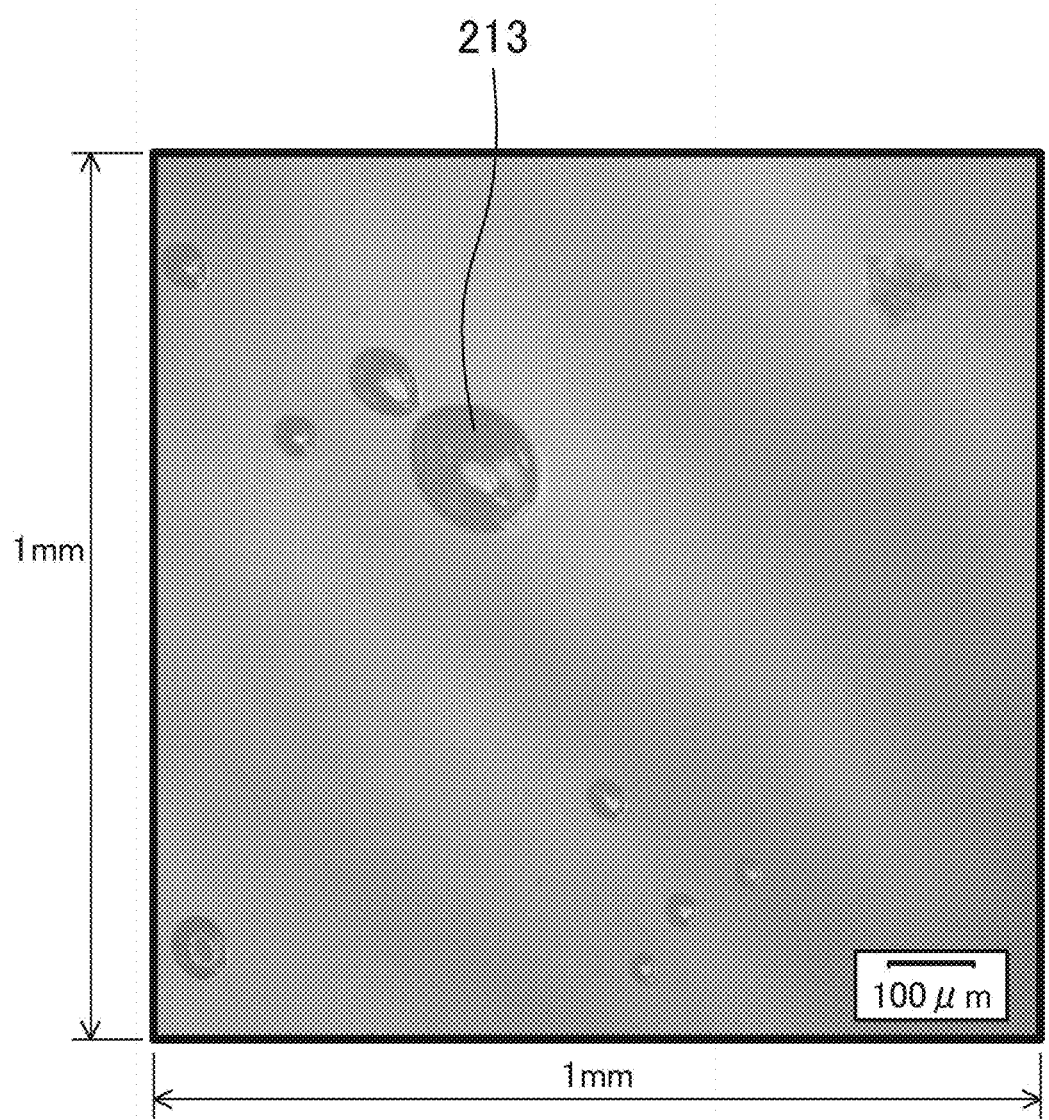
FIG. 19 is an optical microscope image obtained by the observation experiment in FIG. 17.

As shown in FIG. 18, a face of 1 mm×1 mm denoted by 40A is referred to as an observation face with respect to an observation direction 44A from the objective lens 44 in FIG. 17. FIG. 19 shows an example of the observation face 40A.

First, the area of one micronanobubble 213 included in the observation face 40A was measured.

Regarding the area of the micronanobubble 213 as the area of a circle, the radius of the circle was calculated, and the volume of a sphere having this radius was calculated and taken as a volume MA1 of the micronanobubble 213.

Similarly, volumes MA1 were calculated for other micronanobubbles 213 included in the observation face 40A.

The volumes of all micronanobubbles 213 included in the observation face 40A were summed, and the total was taken as a content MA2 of the micronanobubbles 213 included in the observation face 40A.

Next, similar observation was performed for a plurality of observation faces in a cube 40B having a height of ±0.5 mm from the observation face 40A as the base in the observation direction 44A, and the content MA2 of micronanobubbles contained in each observation face was calculated.

The average value of the contents MA2 of micronanobubbles included in the observation faces was then calculated and taken as the total content MA3 of micronanobubbles 213 included in the cube 40B.

Thereafter, a content MA4 of micronanobubbles having a diameter of greater than or equal to 2 μm and less than 1000 μm included in the micronanobubble water was calculated by vol %.

Tables 6 to 8 show the calculation results of micronanobubbles in Experiment Example 1.

TABLE 6

| Observation face | Radius [μm] | Diameter [μm] | Volume of sphere MA1 [mm³/mm³] | Content MA2 [mm³/mm³] |
|---|---|---|---|---|
| 1 | 26 | 52 | 0.000076 | 0.00249 |
|   | 25 | 50 | 0.000068 |   |
|   | 39 | 78 | 0.000254 |   |
|   | 22 | 44 | 0.000042 |   |
|   | 17 | 34 | 0.000019 |   |

TABLE 6-continued

| Observation face | Radius [μm] | Diameter [μm] | Volume of sphere MA1 [mm³/mm³] | Content MA2 [mm³/mm³] |
|---|---|---|---|---|
| | 21 | 42 | 0.000036 | |
| | 17 | 34 | 0.000021 | |
| | 35 | 70 | 0.000185 | |
| | 75 | 150 | 0.00179 | |
| 2 | 33 | 66 | 0.000156 | 0.00029 |
| | 23 | 46 | 0.00005 | |
| | 19 | 38 | 0.000028 | |
| | 17 | 34 | 0.000019 | |
| | 15 | 30 | 0.000015 | |
| | 18 | 36 | 0.000024 | |

TABLE 7

| Observation face | Radius [μm] | Diameter [μm] | Volume of sphere MA1 [mm³/mm³] | Content MA2 [mm³/mm³] |
|---|---|---|---|---|
| 3 | 52 | 104 | 0.000598 | 0.00141 |
| | 27 | 54 | 0.000081 | |
| | 42 | 84 | 0.000304 | |
| | 29 | 58 | 0.000099 | |
| | 33 | 66 | 0.00015 | |
| | 34 | 68 | 0.000164 | |
| | 14 | 28 | 0.000011 | |
| | 13 | 26 | 0.000008 | |
| | 7 | 14 | 0.000001 | |
| | 8 | 16 | 0.000001 | |
| 4 | 8 | 16 | 0.000001 | 0.00292 |
| | 18 | 36 | 0.000024 | |
| | 18 | 36 | 0.000024 | |
| | 21 | 42 | 0.000039 | |
| | 10 | 20 | 0.000003 | |
| | 26 | 52 | 0.000073 | |
| | 55 | 110 | 0.000712 | |
| | 65 | 130 | 0.001127 | |
| | 59 | 118 | 0.000876 | |
| | 22 | 44 | 0.000044 | |

TABLE 8

| Observation face | Content MA2 [mm³/mm³] | Total content MA3 [mm³/mm³] | Content of micronanobubbles MA4 [vol %] |
|---|---|---|---|
| 1 | 0.00249 | 0.0018 | 0.18 |
| 2 | 0.00029 | | |
| 3 | 0.00141 | | |
| 4 | 0.00292 | | |

Experiment Example 2

For the specimen 40 of the micronanobubble water jelly in Experiment Example 1, micronanobubbles having a diameter of less than 2 μm were observed using an optical microscope (DSX510 manufactured by Olympus Corporation).

Figure 20:
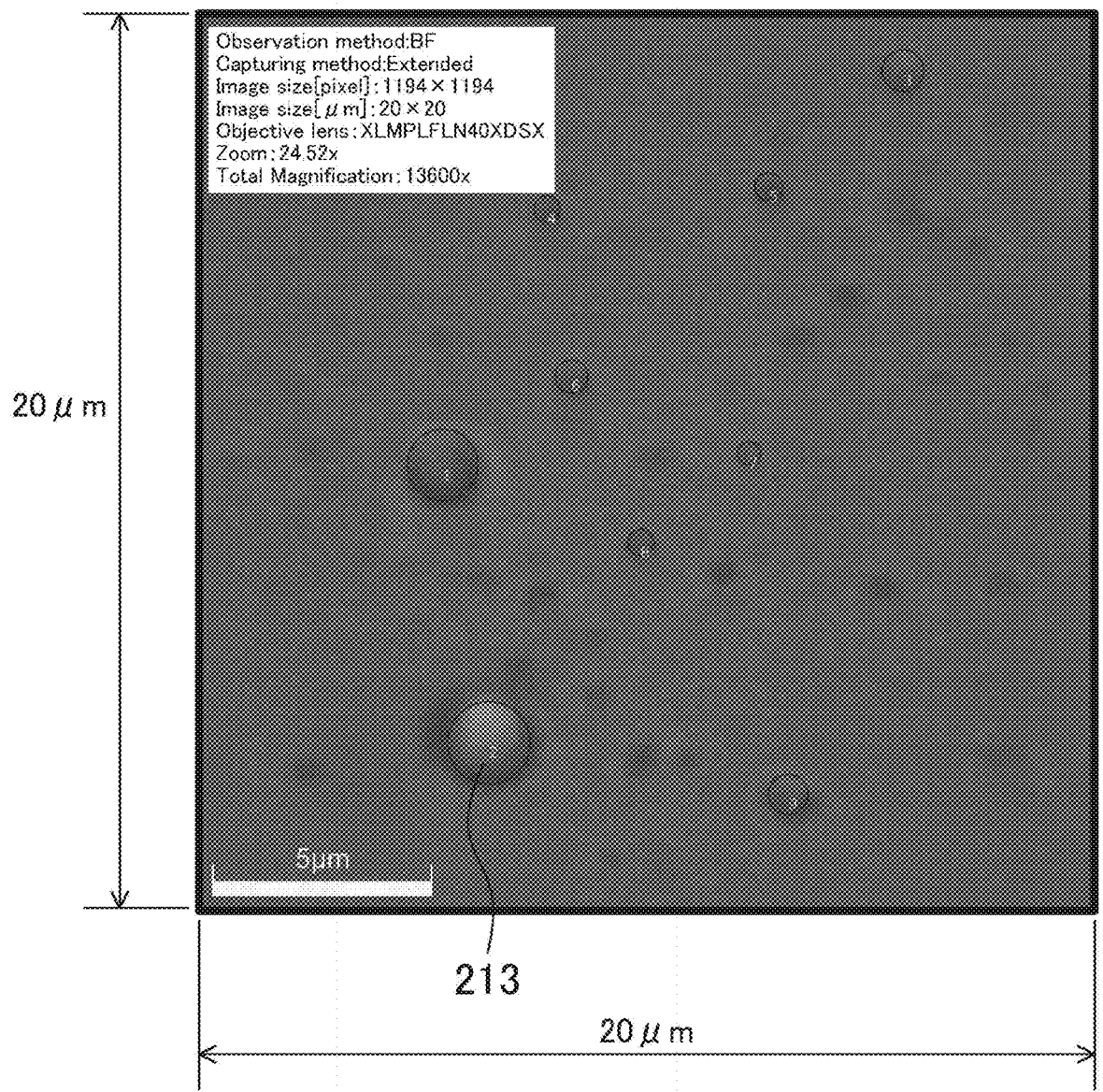
FIG. 20 is an optical microscope image obtained by observation experiment using another optical microscope.

In this experiment, the area of one micronanobubble 213 included in one observation face of 20 μm×20 μm was measured. FIG. 20 shows an example of the observation face.

Regarding the area of the micronanobubble 213 as the area of a circle, the radius of the circle was calculated, and the volume of a sphere having this radius was calculated and taken as a volume MB1 of the micronanobubble 213.

Similarly, volumes MB1 were calculated for other micronanobubbles 213 included in the observation face.

The volumes of all micronanobubbles 213 included in the observation face were summed, and the total was taken as a total content MB3 of micronanobubbles 213 included in a cube of 20 μm×20 μm×20 μm (=8000 μm³) including the observation face.

Thereafter, a content MB4 of micronanobubbles having a diameter of less than 2 μm included in the micronanobubble water was calculated by vol %.

Table 9 shows the calculation results of micronanobubbles in Experiment Example 2.

TABLE 9

| Observation face | Radius [μm] | Diameter [μm] | Volume of sphere MB1 [mm³/mm³] | Total content MB3 [mm³/mm³] | Content of micronanobubbles MB4 [vol %] |
|---|---|---|---|---|---|
| 5 | 0.811 | 1.623 | 0.000279 | 0.00090 | 0.09 |
| | 0.940 | 1.880 | 0.000434 | | |
| | 0.474 | 0.948 | 0.000055 | | |
| | 0.300 | 0.600 | 0.000014 | | |
| | 0.319 | 0.638 | 0.000017 | | |
| | 0.375 | 0.750 | 0.000027 | | |
| | 0.261 | 0.522 | 0.000009 | | |
| | 0.302 | 0.604 | 0.000014 | | |
| | 0.456 | 0.912 | 0.000049 | | |

From the results of Tables 8 and 9, it is found that the content of micronanobubbles included in the micronanobubble water is 0.27 vol % as the sum of MA4 and MB4.

INDUSTRIAL APPLICABILITY

The present disclosure is very useful in the field of hot forging.

DESCRIPTION OF REFERENCE CHARACTERS

1 Die (hot-forging die)
12 Upper die
13 Lower die
2 Application device (application device for a release agent for a hot-forging die)
20 Tank (storage unit)
21 Release agent (release agent for a hot-forging die)
22 Agitator (agitating means)
23 Micronanobubble generator (bubble generating means)
210 Release agent undiluted solution
213 Micronanobubble
3 Release agent spray unit (spraying means)
S1 Filling step
S2 Bubble generating step
S3 Agitating step
S4 Supplying step
S5 Spraying step

The invention claimed is:

1. An application method for a release agent for a hot-forging die containing micronanobubbles, the method comprising the steps of:
   filling a storage unit provided with a bubble generator/bubble generators and an agitator/agitators with a release agent undiluted solution;
   generating the micronanobubbles in the release agent undiluted solution by the bubble generator(s);
   agitating the release agent undiluted solution by the agitator(s) thereby dispersing the micronanobubbles generated in the release agent undiluted solution uniformly to obtain the release agent for the hot-forging die;
   supplying the release agent to a spraying unit/spraying units; and
   spraying the release agent onto the hot-forging die by the spraying unit(s),
   wherein,
   the release agent is sprayed onto the hot-forging die in a shape of particles having a Sauter mean diameter of greater than or equal to 10 μm and less than or equal to 30 μm,
   the average thickness of a release agent layer formed of the release agent applied to the hot-forging die is greater than or equal to 2.3 μm and less than or equal to 15 μm,
   in the generating step,
      air is supplied to the bubble generator(s) with an air supply pressure of greater than or equal to 0.03 MPa and less than or equal to 0.3 MPa, and
      the supply amount of the micronanobubbles by the bubble generator(s) is greater than or equal to 1 L/min and less than or equal to 100 L/min, and
   in the supplying step,
      the supply pressure to the release agent is greater than or equal to 0.5 MPa and less than or equal to 2.0 MPa, and
      the atomizing air pressure supplied to the spraying unit(s) is greater than or equal to 0.20 MPa and less than or equal to 0.80 MPa.

2. An application method for a release agent for a hot-forging die containing micronanobubbles, the method comprising the steps of:
   filling a storage unit provided with a bubble generator/bubble generators and an agitator/agitators with a release agent undiluted solution;
   generating the micronanobubbles in the release agent undiluted solution by the bubble generator(s);
   agitating the release agent undiluted solution by the agitator(s) thereby dispersing the micronanobubbles generated in the release agent undiluted solution uniformly to obtain the release agent for the hot-forging die;
   supplying the release agent to a spraying unit/spraying units; and
   spraying the release agent onto the hot-forging die by the spraying unit(s),
   wherein,
   the diameters of the micronanobubbles are greater than or equal to 0.1 μm and less than or equal to 200 μm,
   the release agent is sprayed onto the hot-forging die in a shape of particles having a Sauter mean diameter of greater than or equal to 10 μm and less than or equal to 30 μm,
   the average thickness of a release agent layer formed of the release agent applied to the hot-forging die is greater than or equal to 2.3 μm and less than or equal to 15 μm,
   in the generating step,
      air is supplied to the bubble generator(s) with an air supply pressure of greater than or equal to 0.03 MPa and less than or equal to 0.3 MPa, and
      the supply amount of the micronanobubbles by the bubble generator(s) is greater than or equal to 1 L/min and less than or equal to 100 L/min, and
   in the supplying step,
      the supply pressure to the release agent is greater than or equal to 0.5 MPa and less than or equal to 2.0 MPa, and
      the atomizing air pressure supplied to the spraying unit(s) is greater than or equal to 0.20 MPa and less than or equal to 0.80 MPa.

3. An application method for a release agent for a hot-forging die containing micronanobubbles, the method comprising the steps of:
   filling a storage unit provided with a bubble generator/bubble generators and an agitator/agitators with a release agent undiluted solution;
   generating the micronanobubbles in the release agent undiluted solution by the bubble generator(s);
   agitating the release agent undiluted solution by the agitator(s) thereby dispersing the micronanobubbles generated in the release agent undiluted solution uniformly to obtain the release agent for the hot-forging die;
   supplying the release agent to a spraying unit/spraying units; and
   spraying the release agent onto the hot-forging die by the spraying unit(s), wherein,
the diameters of the micronanobubbles are greater than or equal to 0.1 μm and less than or equal to 200 μm,
the content of the micronanobubbles is greater than or equal to 0.1 vol % and less than or equal to 10 vol %,
the release agent is sprayed onto the hot-forging die in a shape of particles having a Sauter mean diameter of greater than or equal to 10 μm and less than or equal to 30 μm,
the average thickness of a release agent layer formed of the release agent applied to the hot-forging die is greater than or equal to 2.3 μm and less than or equal to 15 μm,
in the generating step,
    air is supplied to the bubble generator(s) with an air supply pressure of greater than or equal to 0.03 MPa and less than or equal to 0.3 MPa, and
    the supply amount of the micronanobubbles by the bubble generator(s) is greater than or equal to 1 L/min and less than or equal to 100 L/min, and
in the supplying step,
    the supply pressure to the release agent is greater than or equal to 0.5 MPa and less than or equal to 2.0 MPa, and
    the atomizing air pressure supplied to the spraying unit(s) is greater than or equal to 0.20 MPa and less than or equal to 0.80 MPa.

4. An application method for a release agent for a hot-forging die, comprising spraying the release agent onto the hot-forging die,
wherein,
the release agent contains dispersed micronanobubbles,
the diameters of the micronanobubbles are greater than or equal to 0.1 μm and less than or equal to 200 μm, and
the content of the micronanobubbles is greater than or equal to 0.1 vol % and less than or equal to 10 vol %.

5. The application method of claim 4, wherein the release agent is a water-soluble release agent.

6. The application method of claim 5, wherein the release agent is a water-soluble graphite-based release agent having graphite particles dispersed in water and/or a water-soluble white release agent containing no graphite made by blending water-soluble polymers or inorganic salts and adding a solid lubricant.

* * * * *